(12) United States Patent
Kondo et al.

(10) Patent No.: US 6,728,919 B1
(45) Date of Patent: Apr. 27, 2004

(54) MOBILE TELEPHONE SYSTEM AND SITE DIVERSITY RECEPTION METHOD

(75) Inventors: Takayuki Kondo, Tokyo (JP); Yoshinori Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/377,846

(22) Filed: Aug. 20, 1999

(30) Foreign Application Priority Data

Aug. 20, 1998 (JP) .......................................... 10-233701

(51) Int. Cl.[7] .......................... H03M 13/00; H04L 1/18
(52) U.S. Cl. ........................ 714/751; 714/701; 714/746
(58) Field of Search ................................ 714/751, 701, 714/756, 758, 786, 784, 746; 455/101, 39; 370/479

(56) References Cited

U.S. PATENT DOCUMENTS

| | | | |
|---|---|---|---|
| 5,606,569 A | | 2/1997 | MacDonald et al. |
| 5,640,414 A | | 6/1997 | Blakeney, II et al. |
| 5,719,871 A | | 2/1998 | Helm et al. |
| 6,132,306 A | * | 10/2000 | Trompower ................ 455/11.1 |
| 6,219,550 B1 | * | 4/2001 | Kanerva et al. ............ 455/436 |

FOREIGN PATENT DOCUMENTS

| | | |
|---|---|---|
| EP | 0 609 188 A2 | 8/1994 |
| JP | 52-57711 | 5/1977 |
| JP | 54-131811 | 10/1979 |
| JP | 55-77247 | 6/1980 |
| JP | 5-29992 | 2/1993 |
| JP | 6-77941 | 3/1994 |
| JP | 6-252891 | 9/1994 |
| JP | 7-143101 | 6/1995 |
| JP | 7-212816 | 8/1995 |
| JP | 8-251143 | 9/1996 |
| JP | 9-284208 | 10/1997 |

OTHER PUBLICATIONS

T. Sato, "CDMA Technique Fundament to Application", Dec. 26, 1997, pp. 103–106.

* cited by examiner

*Primary Examiner*—Phung M. Chung
(74) *Attorney, Agent, or Firm*—Sughrue Mion, PLLC

(57) ABSTRACT

A method of and an apparatus for reducing the transmission error rate in the site diversity reception among related base stations system are disclosed. A base station controller compares data received from a plurality of related base stations to eliminate errors in frame unit base, predetermined size unit base which is divided from a frame, or bit unit base, and composes those units based on the decision by majority but adopts the data having highest reception potential when the comparison by the way described above is unavailable, in order to transfer no error data.

16 Claims, 17 Drawing Sheets

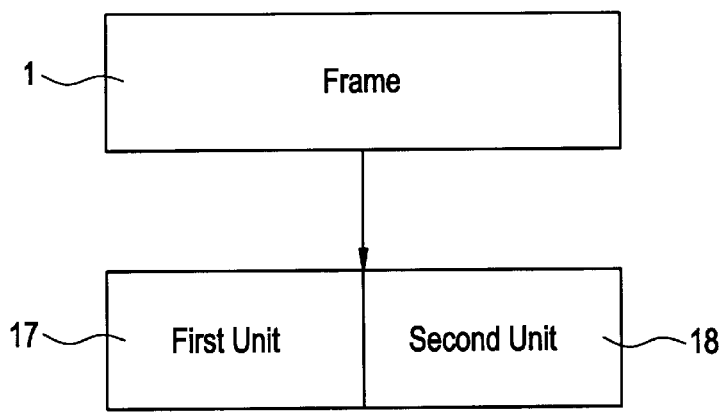
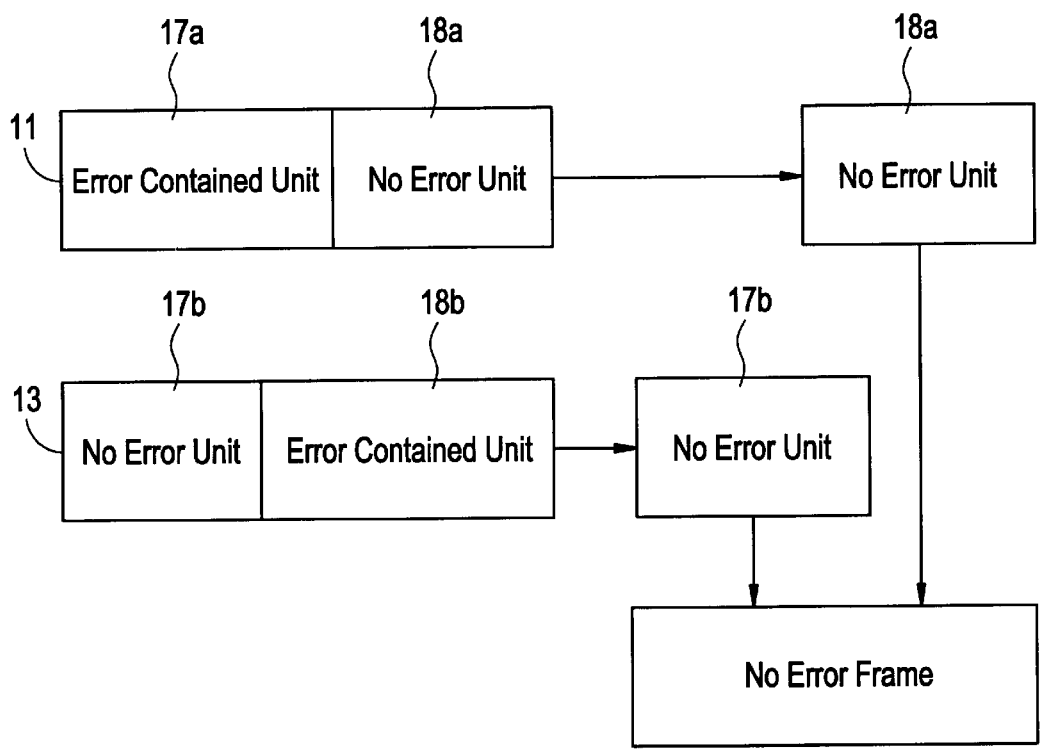

FIG. 11

| Number of Base Stations Related To Diversity Reception | Number of Units Divided From Frame | Frame Error Ratio | Number of Combinations To Be Processed |
|---|---|---|---|
| 2 | 2 | $(1/2)^2 \times 2 = 1/2$ | $2^2 - 2 = 2$ |
| 3 | 2 | $(1/2)^3 \times 2 = 1/4$ | $3^2 - 3 = 6$ |
| 2 | 3 | $(1/3)^2 \times 3 = 1/3$ | $2^3 - 2 = 6$ |
| 3 | 3 | $(1/3)^3 \times 3 = 1/9$ | $3^3 - 3 = 24$ |
| 2 | 4 | $(1/4)^2 \times 4 = 1/4$ | $2^4 - 2 = 14$ |
| 3 | 4 | $(1/4)^3 \times 4 = 1/16$ | $3^4 - 3 = 78$ |
| 2 | 5 | $(1/5)^2 \times 5 = 1/5$ | $2^5 - 2 = 30$ |
| N | M | $(1/M)^N \times M$ | $N^M - N$ |

Frame Transmitted From Mobile Stations

Frame Received Through Base Station 11

CRC: NG

Frame Received Through Base Station 13

CRC: NG

Incoincident Bits

Rearrange Incoincident Bits

No Error Frame

CRC: OK

FIG. 14A
Frame Transmitted From Mobile Station 5
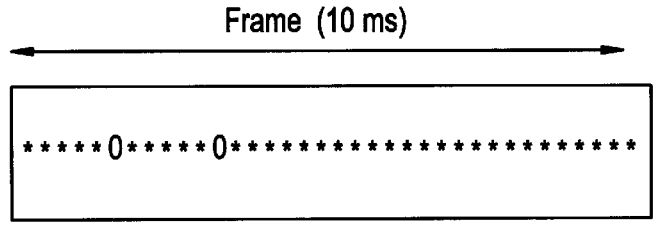
Frame (10 ms)
FIG. 14B
Frame Received Through Base Station 11
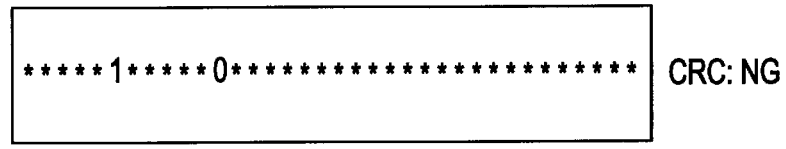
CRC: NG
FIG. 14C
Frame Received Through Base Station 13
CRC: NG
FIG. 14D
Frame Combinations
(1)  0    0    Possible To Be No Error
(2)  ~~0~~  ~~1~~  Contains Error
(3)  ~~1~~  ~~0~~  Contains Error
(4)  1    1    Possible To Be No Error
FIG. 14E
Rearrangement of Coincident Bits
FIG. 14F
Detect No Error Frame Combination
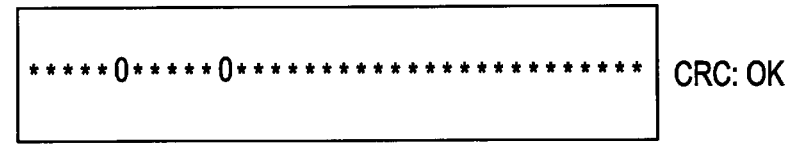
CRC: OK

FIG. 15A
Frame Transmitted From Mobile Station 5
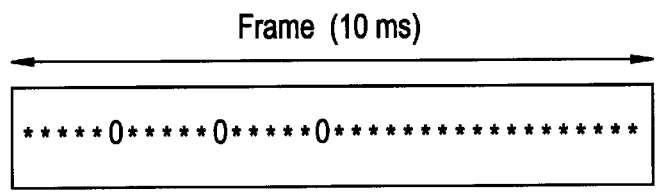
FIG. 15B
Frame Received From The 1st Base Station
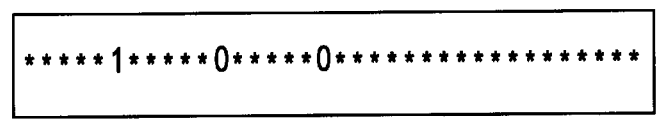
CRC: NG
FIG. 15C
Frame Received From The 2nd Base Station
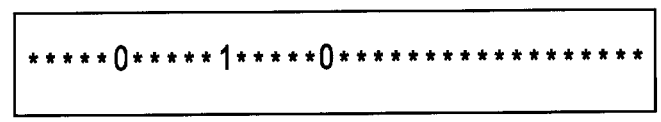
CRC: NG
FIG. 15D
Frame Received From The 3rd Base Station
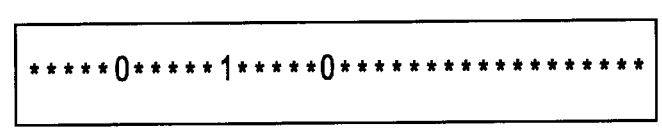
CRC: NG
FIG. 15E
Frame Combinations
(1) 0 0 0
(2) ~~0 0 1~~
(3) ~~0 1 0~~
(4) 0 1 1
(5) ~~1 0 0~~
(6) 1 0 1
(7) 1 1 0
(8) 1 1 1
FIG. 15F
Rearrangement of Incoincident Bits
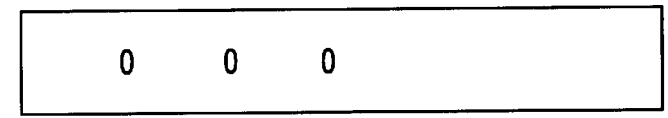
FIG. 15G
Detection No Error Bits Combination
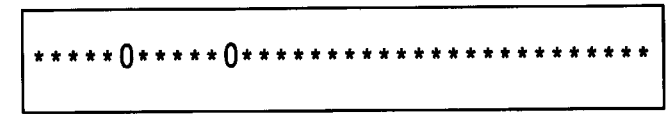
CRC: OK FIG. 16A
Frame Transmitted By Mobile Station 5
Frame (10 ms)
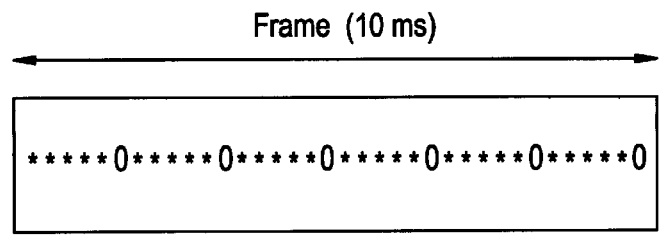
FIG. 16B
Frame Received By The 1st Base Station
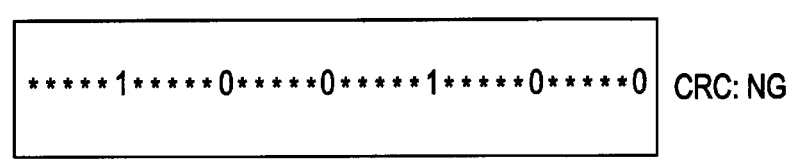 CRC: NG
FIG. 16C
Frame Received By The 2nd Base Station
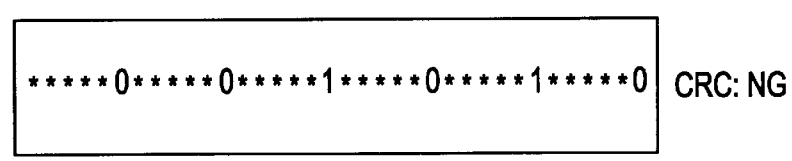 CRC: NG
FIG. 16D
Frame Received By The 3rd Base Station
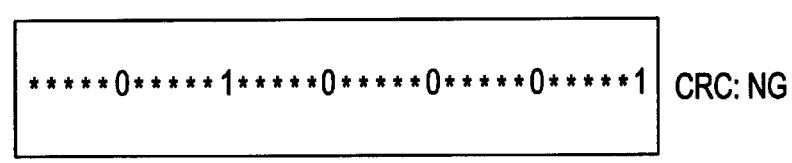 CRC: NG
FIG. 16E
Decision By Majority
0   0   0   0   0   0
FIG. 16F
Detect No Error Bits Combination
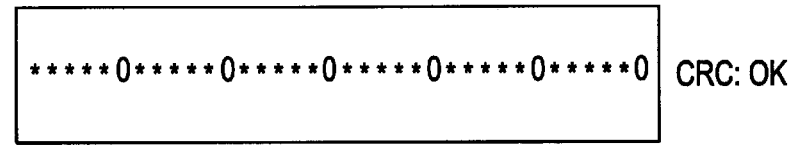 CRC: OK

MOBILE TELEPHONE SYSTEM AND SITE DIVERSITY RECEPTION METHOD

BACKGROUND OF THE INVENTION

1. Field of the Invention

The present invention relates to a mobile telephone system, and more particularly to a mobile telephone system which adopts the site diversity reception wherein a signal from a mobile station is received by a plurality of base stations to choose the most available base station.

2. Description of the Related Arts

Mobile telephone systems such as portable telephone systems have been popularized widely. In a mobile communication system of the cellular system, for example, each of a plurality of base stations has an area called cell covered by it, and the cells are disposed without any gap among them to allow a mobile station to communicate over a wide area.

In the cellular mobile telephone system, when a mobile station moves into a new cell, the communication is switched over from the present base station to the base station which covers the new cite without being suffered from interruption of the communication. The switch over of communication is called as "hand over".

Where a plurality of cells form an area in which they overlap each other on the boundary between or among them, if a mobile station roams into the overlapping area, it can communicate with all of the base stations which cover the overlapping area, or in other words, can communicate with a plurality of base stations simultaneously.

This fact is utilized in a conventional mobile telephone system (for example, a spread spectrum system) so that, when a mobile station is roaming around the boundary of two base stations, the mobile station communicates with the two base stations simultaneously. The method just described is adopted by the diversity hand over which is disclosed, for example, in "From the Beginning to Applications of the CDMA (Code Division Multiple Access) Technique" by Takuro Satoh, published by Linearize Company.

The diversity hand over described in the "CDMA Technique" is one of the communication system described above, a reception of an upward link signal from a mobile station to base station is utilized a site diversity reception among a plurality of related base stations.

The conventional site diversity reception among related base stations selection is described below.

FIG. 1 is a schematic block diagram of a usual mobile telephone system.

Referring to FIG. 1, base station 1 covers cell 2, and base station 3 covers cell 4. Base station 1 and base station 3 communicate through base station controller 6. Connector 7 to different networks is, for instance, a mobile communication switch or a gateway switch for connecting to a public telephone network.

The conventional mobile telephone system has the space diversity configuration. In particular, when cell 2 and cell 4 have an overlapping area among them and mobile station 5 is roaming within the overlapping area as seen in FIG. 1, mobile station 5 communicates with both of base stations 1 and 3 simultaneously. The signals received by the two base stations from mobile station 5 are combined by a host station, i.e., base station controller 6, and then transmitted to the other party of communication.

FIG. 2 is a block diagram showing a structure of a conventional base station and base station controller.

Base station 1 includes receiver 1b for receiving a radio signal from mobile station 5 through reception antenna 1a, analog to digital converter 1c for converting the analog signal from receiver 1b into a digital signal, counter spreader 1d for counter spreading the signal from analog to digital converter 1c, decoder 1e for decoding the signal from counter spreader 1d, error detector 1f for detecting whether the signal from decoder 1e contains some error or not, and reception level measurement unit 1g for measuring the reception level of the signal from counter spreader 1d. The signal from mobile station 5 after the error detection by error detector 1f is transmitted to base station controller 6. Also the information of a result of the detection by error detector 1f representing whether some error is included or not is transmitted to base station controller 6. Further, also the reception level measured by reception level measurement unit 1g is transmitted to base station controller 6.

Also base station 3 similarly includes receiver 3b, analog to digital converter 3c, counter spreader 3d, decoder 3e, error detector 3f, and reception level measurement unit 3g. Base station 3 transmits a signal from mobile station 5 after error detection by error detector 3f to base station controller 6, transmits information of a result of detection by error detector 3f whether some error is found or not to base station controller 6, and further transmits a reception level measured by reception level measurement unit 3g to base station controller 6.

Base station controller 6 includes selective composition controller 6m, data buffer 6b for storing a signal from base station 1, and data buffer 6c for storing a signal from base station 3.

FIG. 3 is a block diagram showing an internal structure of selective composition controller 6m shown in FIG. 2.

A signal from mobile station 5 transmitted through base station 1 is inputted to and stored into data buffer 6b. A signal from mobile station 5 transmitted through base station 3 is inputted to and stored into data buffer 6c.

Selective composition controller 6m includes no error data selector 6f, and highest reception level data selector 6k.

No error data selector 6f refers to information of presence/absence of an error received from base stations 1 and 3 and controls data buffers 6b and 6c to select that one of the data stored in data buffers 6b and 6c (signals from mobile station 5 received through base stations 1 and 3) which includes no error.

If both information of presence/absence of error received from base stations 1 and 3 indicates absence of error, then either information may be selected. On the other hand, if both information of presence/absence of error received from base stations 1 and 3 indicates presence of error, no error data selector 6f informs highest reception level data selector 6k of the presence of error.

If both information of presence/absence of error received from base stations 1 and 3 indicates presence of error, then highest reception level data selector 6k refers to reception levels received from base stations 1 and 3, and controls data buffers 6b and 6c to be selected either one having higher reception level data.

In this manner, that one of the data stored in data buffers 6b and 6c which is selected by selective composition controller 6m is transmitted to connector 7 to a different network.

As described above, in the conventional mobile telephone system, a signal from a mobile station to a base station (upward link signal) is received by a plurality of base stations, and each of the base stations performs error detection detecting an error detection signal included periodically (for example, at intervals of 10 ms) in the received signal and measurement of the reception level. Then, each of the base stations sends results of the error detection and the measurement of the reception level to a base station controller which is connected to the base stations and acts as a controlling apparatus to them. The base station controller selects one of the signals sent thereto from the base stations which is free from an error, but if all of the received signals contain an error, then the base station controller selects that one of the received signals which has the highest reception level, thereby to assure augmented reception quality.

In a mobile telephone system, a signal is divided into units called frames before it is transmitted from a mobile station to a base station. Error detection code mentioned above is provided for each frame formed with a time width of, for example, 10 ms, so that a transmission error can be detected in units of a frame.

FIG. 4 is a diagrammatic view showing an example of a structure of a frame used in a mobile telephone system.

As seen in FIG. 4, the frame shown is formed with a time width of 10 ms and includes user information bits which are real information transmitted by a mobile station and CRC (Cyclic Redundancy Check) check bits which form error detection codes.

However, in a conventional selection diversity system, if all of signals transmitted from a base station contain an error, then a base station controller selects one of the signals which has the highest reception level. Therefore, a signal transmitted to a connector to a different network in this instance contains an error without exception.

Where a signal in the form of a voice signal is transmitted, conversation is possible even if the signal includes some error. However, advancement of multimedia technology in recent years has increased transmission of data of images and the like information. Where the signal to be transmitted is data of images or the like, even a small amount of data error disables the value of data. Therefore, a mobile telephone system which allows further reduction of the error rate than ever is demanded.

SUMMARY OF THE INVENTION

It is an object of the present invention to provide a mobile telephone system of the selective diversity type which can transmit data with a reduced error rate.

In order to attain the object described above, according to an aspect of the present invention, there is provided a communication system, wherein communication information from a transmitter is received by a plurality of receivers, and if all of the communication information received by the receivers contain a communication error, then communication information free from a communication error is produced based on the communication information received by one of the receivers and the communication information received by the other one or ones of the receivers.

According to another aspect of the present invention, there is provided a mobile telephone system which employs the among base stations selective diversity wherein a signal from a mobile station is received by a plurality of base stations and the base stations transmit the respective received signals to a base station controller, wherein the base station controller produces a signal free from a communication error based on the signal from a predetermined one of the base stations and the signal or signals from the other one or ones of the base stations.

The mobile telephone system according to claim 2 of the present invention is characterized in that each of the signals received through the base stations by the base station controller includes a frame composed of user information bits which are real information transmitted from the mobile station and CRC check bits which form error detection codes, and the base station controller divides each of frames from the base stations into units of a predetermined size and rearranges the units into several combinations to obtain a signal free from a communication error.

The mobile telephone system according to claim 2 of the present invention is characterized in that the base station controller compares the signals received through the base stations with each other in units of a bit and changes the value of a bit with regard to which the result of the comparison does not exhibit coincidence to produce a signal free from a communication error.

According to a further aspect of the present invention, there is provided a mobile telephone system which employs the among base stations selective diversity wherein a signal from a mobile station is received by a plurality of base stations and the base stations transmit the respective received signals to a base station controller, wherein the signal received from the mobile station by the base stations is a signal of Reed-Solomon codes, and the base station controller compares the signals received through the base stations with each other in units of a bit, estimates that a symbol which contains a bit with regard to which the result of the comparison does not exhibit coincidence is an erroneous symbol, and uses the result of the estimation as error symbol position information in Reed-Solomon decoding to augment the error correction capability by the Reed-Solomon decoding.

The mobile telephone system according to claim 3 of the present invention is characterized in that the signal received from the mobile station by the base stations is a signal of convolutional codes and the base station obtains reliability information which represents a magnitude of reception energy for each of units divided from the frame when each of the base stations Viterbi decodes the signal, and when the base station controller changes a combination of the units, the base station controller selects that one of the units with regard to which the reliability information exhibits the highest reliability as a rearrangement candidate thereby to decrease the processing time required to find out a no error frame.

The first characteristic of the present invention resides in that, as described in connection with the first embodiment, when all of the signals received by the receivers in the among base stations selective diversity contain a communication error, the opportunity to obtain a no error signal can be increased by dividing the signal received by each of the base stations into a plurality of units and performing reconstruction and error re-detection for all possible combinations of the divided units of the received signals.

The second characteristic of the present invention resides in that, as described in connection with the second embodiment, when all of the signals received by the receivers in the among base stations selective diversity contain a communication error, the opportunity to obtain a no error signal can be increased by performing comparison of the signals received by the base stations with each other in units of a bit and performing reconstruction and error re-detection for all possible combinations of information bits at positions of the signals at which the signals are different from each other.

The third characteristic of the present invention resides in that, as described in connection with the third embodiment, when all of the signals received by the receivers in the among base stations selective diversity contain a communication error, the error correction capability by Reed-Solomon decoding can be augmented by comparing the signals received through the base stations with each other to detect a position at which the signals are different from each other and using the position as error symbol position information in Reed-Solomon (RS) decoding used for data communication.

The fourth characteristic of the present invention resides in that, although a frame reconstruction function and an error detection function are additionally provided as new functions to the base station controller, a conventional communication protocol can be used as the communication protocol between the base stations and the base station controller.

The fifth characteristic of the present invention resides in that, as described in connection with the fourth embodiment, when all of the signals received by the receivers in the among base stations selective diversity contain a communication error, by dividing each of the signals received by the base stations into a plurality of units, determining reliability information for each of the signal units and reconstructing a frame with the divided signal units selectively used in a descending order of the reliability, a combination of no error signal units can be find out rapidly.

BRIEF DESCRIPTION OF THE DRAWINGS

FIG. 8 is a diagrammatic view illustrating a dividing manner of a frame in the first embodiment;

FIG. 9 is a diagrammatic view showing an example of reconstruction of a frame in the first embodiment;

FIG. 11 indicates the frame error rate and the number of combinations which require processing when the number of base stations (base stations related for a diversity reception) with regard to which selective composition is performed and the frame dividing number are varied;

FIGS. 14(a) to 14(f) are diagrammatic views illustrating the number of combinations in frame reconstruction performed by the frame reconstruction unit shown in FIG. 5 in the second embodiment of the present invention;

FIGS. 15(a) to 15(g) are diagrammatic views illustrating the number of combinations in frame reconstruction performed by the frame reconstruction unit shown in FIG. 5 in the second embodiment of the present invention;

FIGS. 16(a) to 16(f) are diagrammatic views illustrating determination of which one of combinations in frame reconstruction performed by the frame reconstruction unit shown in FIG. 5 is a promising candidate in the second embodiment of the present invention;

DESCRIPTION OF THE PREFERRED EMBODIMENTS

In the following, embodiments of the present invention is described with reference to the drawings.

As described above, a base station controller in a conventional mobile telephone system which receives a signal originated from a certain mobile station through a plurality of base stations selects and adopts one of the signals which has the highest reception level if all of the signals received from the base stations contain some error. Therefore, the signals from those of the base stations which are not selected are not utilized but abandoned in vain. With attention paid to this fact, the present invention contemplates reduction of the error rate of a transmission signal by utilizing the signals from the base stations which are not selected.

In the embodiments described hereinafter, the mobile telephone system has a general construction similar to that described above with reference to FIG. 1, and therefore, it will be described with reference to FIG. 1. Further, the embodiments described hereinafter are applied to a CDMA mobile telephone system. Also it is assumed that a signal transmitted from a mobile station to a base station is transmitted in units of a frame having the structure shown in FIG. 4.

Figure 5:
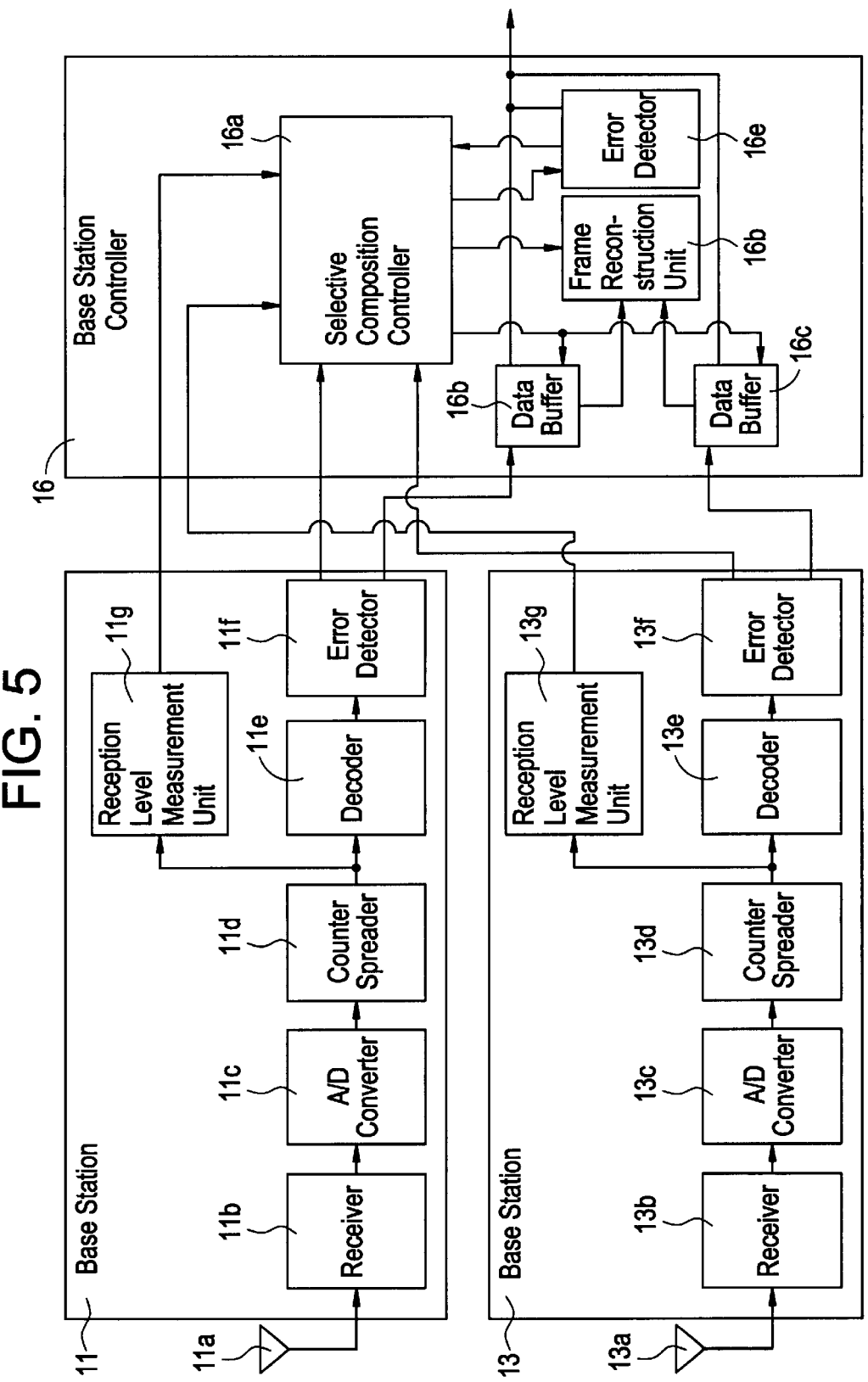
FIG. 5 is a block diagram showing a structure of a base station and a base station controller in a first embodiment of a mobile telephone system according to the present invention.

FIG. 5 is a block diagram showing a structure of a base station and a base station controller in a first embodiment of a mobile telephone system according to the present invention.

Figure 1:
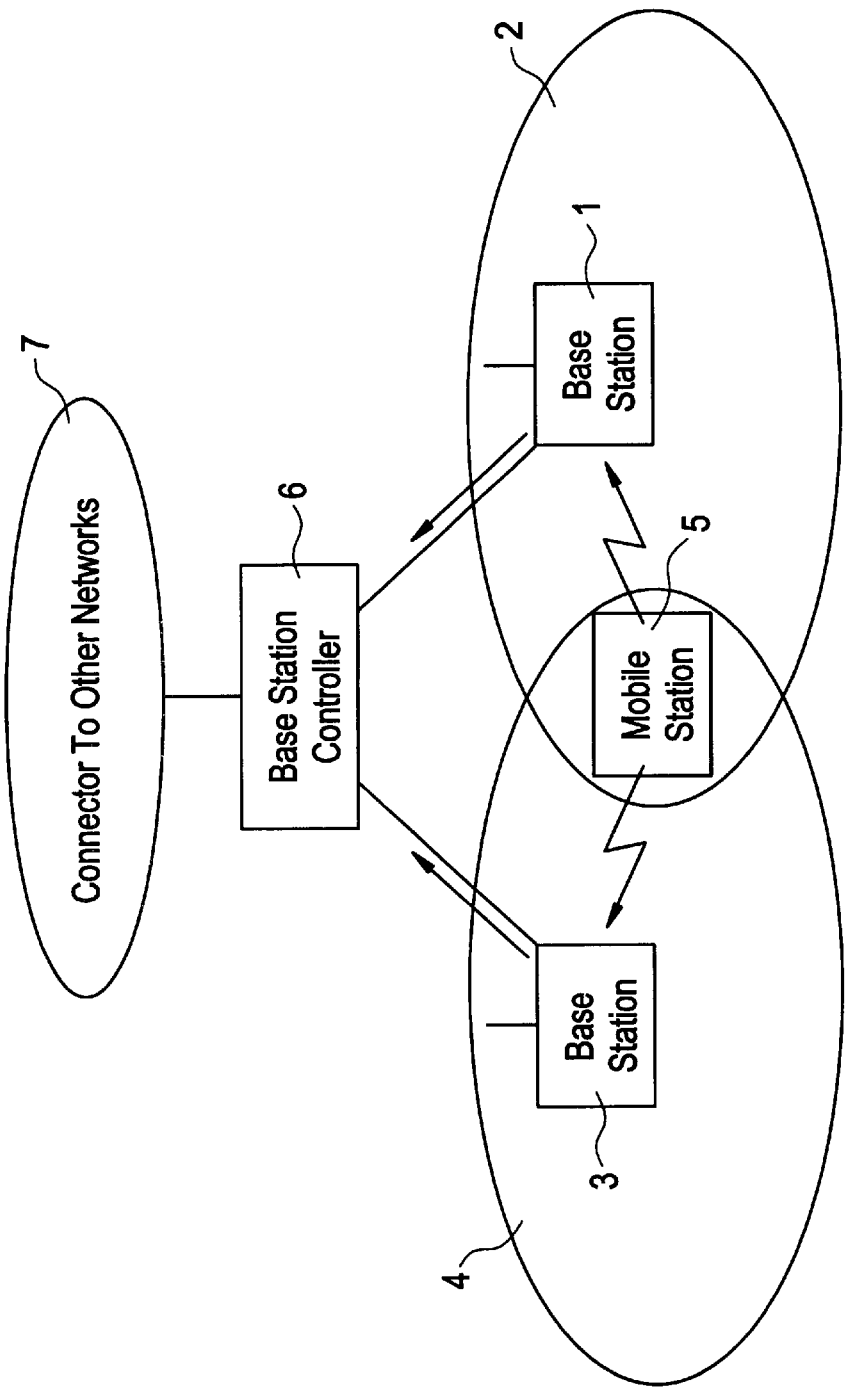
FIG. 1 is a schematic diagrammatic view of a mobile telephone system.
Figure 2:
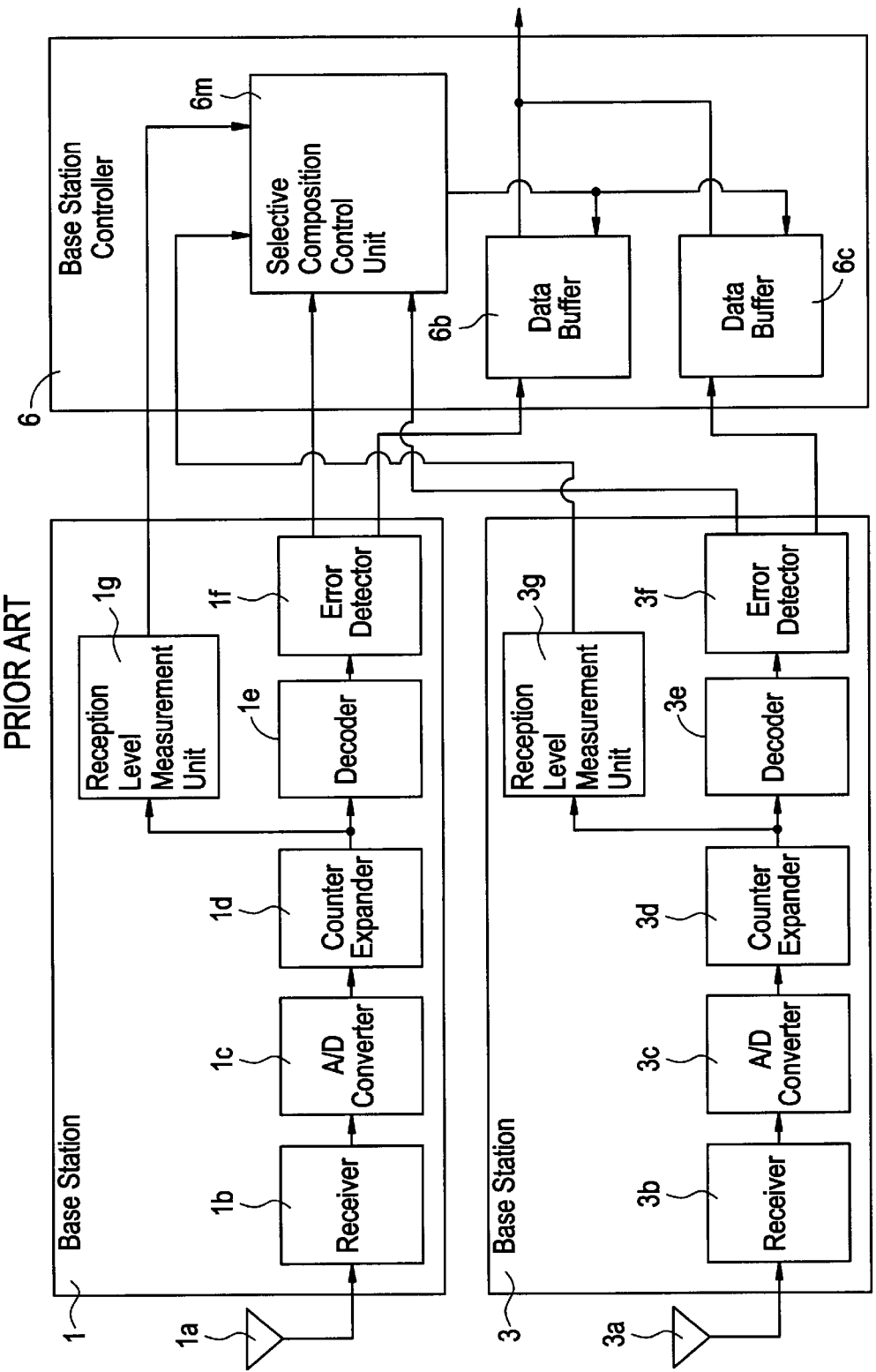
FIG. 2 is a block diagram showing a structure of a conventional base station and base station controller.
Figure 3:
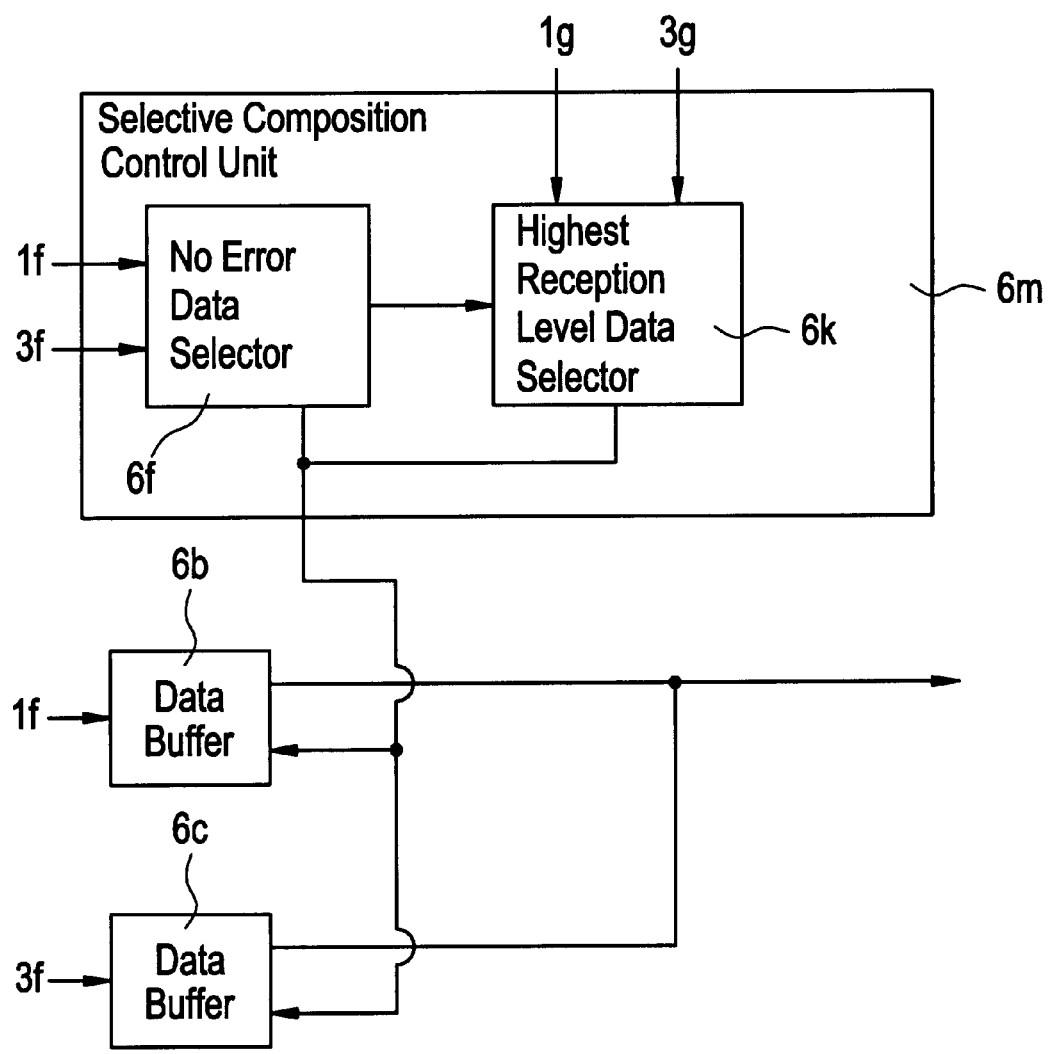
FIG. 3 is a block diagram showing an internal structure of a selective composition controller shown in FIG. 2.

In the present embodiment, mobile station 5 shown in FIG. 1 communicates simultaneously with two base stations including base station 11 and base station 13 shown in FIG. 5, and base station controller 16 shown in FIG. 5 connected to connector 7 to a different network serves as a base station controller of base stations 11 and 13.

Base station 11 includes receiver 11b for receiving a radio signal from mobile station 5 through reception antenna 11a, analog to digital converter 11c for converting the analog signal from receiver 11b into a digital signal, counter spreader 11d for counter spreading the signal from analog to digital converter 11c, decoder 11e for decoding the signal from counter spreader 11d, error detector 11f for detecting whether the signal from decoder 11e contains some error or not, and reception level measurement unit 11g for measuring the reception level of the signal from counter spreader 11d. The signal from mobile station 5 after the error detection by error detector 11f is transmitted to base station controller 16. At this time, also the information of presence/absence of error as a result of the detection by error detector 11f is transmitted to base station controller 16. Further, also the reception level measured by reception level measurement unit 11g is transmitted to base station controller 16.

Also base station 13 similarly includes receiver 13b, analog to digital converter 13c, counter spreader 13d, decoder 13e, error detector 13f and reception level measurement unit 13g. Base station 13 transmits a signal from mobile station 5 after error detection by error detector 13f to base station controller 16, and transmits information of presence/absence of error as a result of detection by error detector 13f to base station controller 16. Base station 13 further transmits a reception level measured by reception level measurement unit 13g to base station controller 16.

Base station controller 16 includes selective composition controller 16a, data buffer 16b for storing a signal from base station 11, data buffer 16c for storing a signal from base station 13, frame reconstruction unit 16d, and error detector 16e.

Figure 6:
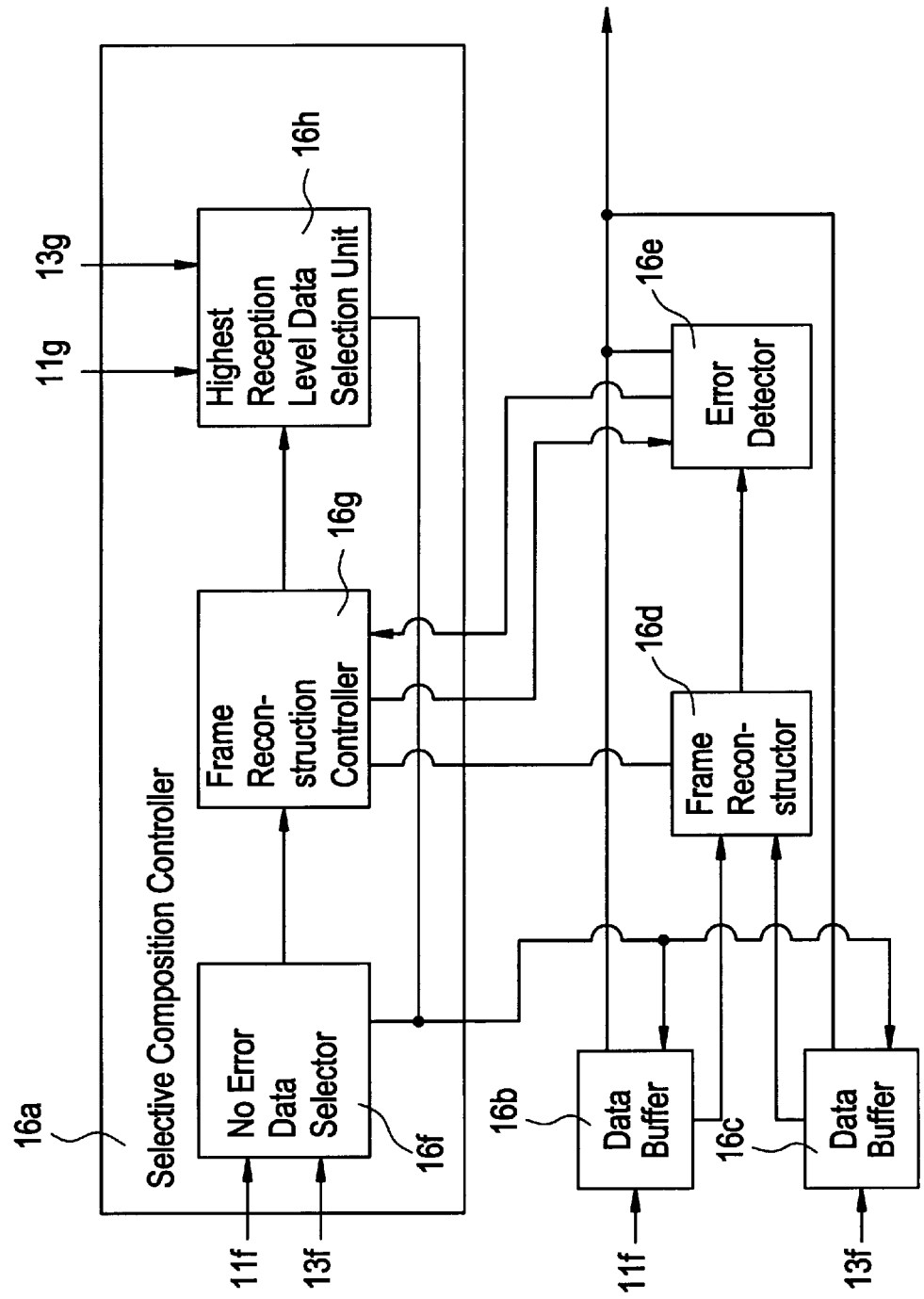
FIG. 6 is a block diagram showing an internal structure of a selection combination controller shown in FIG. 5.

FIG. 6 is a block diagram showing an internal structure of selective composition controller 16a shown in FIG. 5.

A signal from mobile station 5 transmitted through base station 11 is inputted to and stored into data buffer 16b, and the signal from mobile station 5 transmitted through base station 13 is inputted to and stored into data buffer 16c.

Selective composition controller 16a includes no error data selector 16f, frame reconstruction controller 16g, and highest reception level data selector 16h.

The present embodiment is described in more detail below with reference to FIGS. 5 and 6.

A signal transmitted from mobile station 5 is received by a plurality of base stations. For example, the signal is received by base stations 11 and 13 shown in FIG. 5.

In base stations 11 and 13, receiver 11b and 13b perform high frequency demodulation of the signals received by reception antenna 11a and 13a, and counter spreaders 11d and 13d counter spread the output signals of the high frequency demodulation which signals have been spread using pseudo noise code (PN) at the mobile station 5, so that the counter spread signal are sent to decoder 11e and 13e, and to reception level measurement unit 11g and 13g consecutively.

Decoders 11e and 13e decode the signals from counter spreaders 11d and 13d into user information signals, and error detectors 11f and 13f perform error detection with CRC (Cyclic Redundancy Check) bits of the user information signals, respectively. Reception level measurement units 11g and 13g measure the levels of the received signals.

Figure 4:
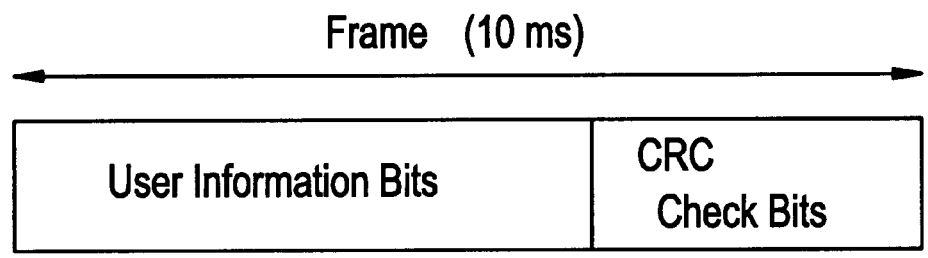
FIG. 4 is a diagrammatic view showing an example of a structure of a frame used in a mobile telephone system.

Base stations 11 and 13 transmit the user information bits and the CRC check bits shown in FIG. 4, the error presence/absence information of results of the detection by error detectors 11f and 13f, and the reception level information of results of the measurement by reception level measurement units 11g and 13g, respectively, to base station controller 16.

As seen in FIG. 6, the user information bits and the CRC check bits from error detectors 11f and 13f are inputted to data buffers 16b and 16c, respectively. The error presence/absence information from error detectors 11f and 13f is inputted to no error data selector 16f of selective composition controller 16a. The reception level information from reception level measurement units 11g and 13g is inputted to highest reception level data selector 16h of selective composition controller 16a.

Selective composition controller 16a controls data buffers 16b and 16c which store the user information bits and the CRC bits, frame reconstruction unit 16d which divides and reconstructs a frame formed from the user information bits and the CRC check bits, and error detector 16e which performs error correction of the reconstructed frame with the CRC check bits. The user information is sent from data buffers 16b and 16c to connector 7 to a different network directly or through frame reconstruction unit 16d and error detector 16e.

Operation of the present embodiment is described hereinafter.

Figure 7:
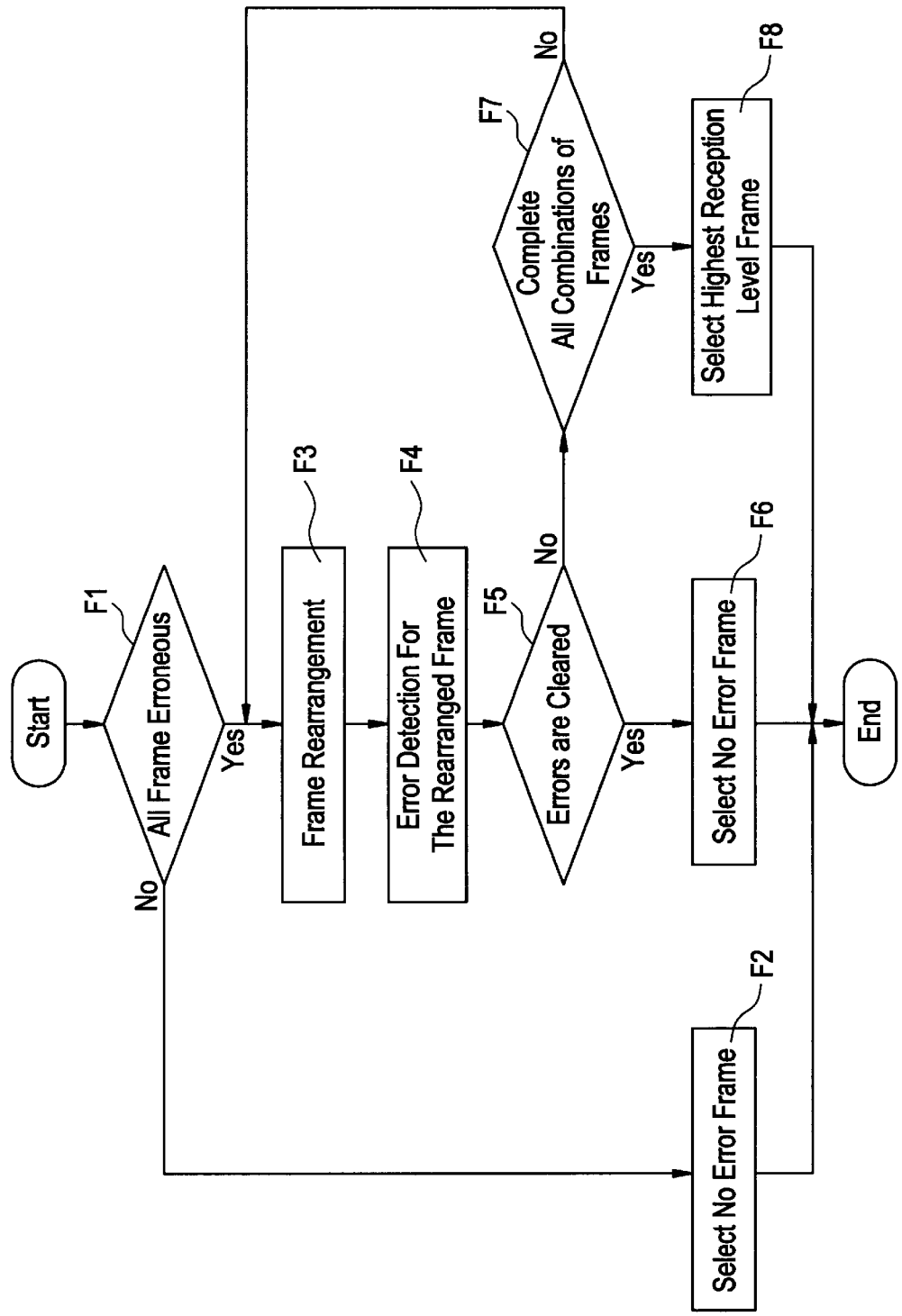
FIG. 7 is a flow chart illustrating operation of the first embodiment of the present invention.

FIG. 7 is a flow chart illustrating operation of the first embodiment of the present invention.

A signal (upward link signal) from mobile station 5 to a base station is received by a plurality of base stations (in the present embodiment, base stations 11 and 13). Each base station performs error detection with an error detection signal (CRC check bits) contained in each radio frame (for example, of 10 ms) of a decoded signal illustrated in FIG. 4 and reception level measurement for each period of transmission power, and sends a result of the error detection and the measured reception level to a base station controller (in the present embodiment, base station controller 16) connected as a host apparatus to the base station.

Information to be sent from each base station to the base station controller in the present embodiment includes:
1. user information (user information bits);
2. error detection information of the user information (CRC check bits);
3. error presence/absence information of the user information (CRC check: OK/NG(no good)); and
4. reception level information of a frame (Eb/I0: ratio between user information bit energy and average interference energy per band).

No error data selector 16f of base station controller 16 decides whether the frames received from the base stations contain a no error frame (step F1). If a no error frame is detected, then no error data selector 16f instructs that one of data buffers 16b and 16c, in which the no error frame is stored, to output the frame, thereby to transmit the no error frame to connector 7 to a different network (step F2).

On the other hand, if it is decided in step F1 that all of the frames from the base stations contain some error, then no error data selector 16f informs frame reconstruction controller 16g of the decision, and frame reconstruction unit 16d performs decomposition and reconstruction of the frames stored in data buffers 16b and 16c under the control of frame reconstruction controller 16g (step F3). The reconstruction is described hereinafter.

FIG. 8 is a diagrammatic view illustrating division of a frame in the first embodiment.

As FIG. 8 shows, in the present embodiment, each frame (composed of user information bits and CRC check bits) is divided into a predetermined number of (2 in FIG. 8) parts (a part obtained by such division is hereinafter referred to as "unit"), and units obtained by dividing one or more frames from one or more other base stations are selectively combined to build up a no error frame. FIG. 8 specifically illustrates division of a frame into two units, and the former divisional unit is called first unit 17 while the latter divisional unit is called second unit 18.

FIG. 9 is a diagrammatic view illustrating an example of a steps of a way how to reconstruct a frame in the first embodiment.

In the reconstruction way illustrated in FIG. 9, the frame from base station 11 includes first unit 17a and second unit 18a, and the frame from base station 13 includes first unit 17b and second unit 18b. The frame from base station 11 has an error only in first unit 17a thereof while the frame from base station 13 has an error only in second unit 18b. In this instance, a no error frame can be produced by selecting and combining second unit 18a of the frame from base station 11 and first unit 17b of the frame from base station 13.

In actual processing, it is not known in which unit a frame has an error. Therefore, each time units are combined, error detection with CRC check bits is performed to determine whether the combination is no error or not, and the processing must be repeated until a no error combination is found out. In the following, the processing will be described with reference to FIG. 7.

When a certain combination is produced (step F3), error detection is performed for the combination (step F4). The error correction is the same processing as that performed by error detectors 11f and 13f shown in FIG. 5 and uses CRC check bits.

A result of the error detection in step F4 is transmitted to frame reconstruction controller 16g. Frame reconstruction controller 16g decides whether a frame provided by the combination of units has no error (step F5). If the frame is no error frame, then frame reconstruction controller 16g instructs error detector 16e to transmit the combined frame to connector 7 to transfer to a different network (step F6).

If the result of the error detection in step F4 proves that the combined units has some error (step F5), then frame reconstruction controller 16g decides whether reconstruction and error detection have been performed for all possible combinations or not (step F7).

If it is decided in step F7 that there remains a combination for which reconstruction and error detection have not been performed yet, then the control returns to step F3 so that reconstruction and error detection may be performed for the remained new combination.

If the decision in step F7 reveals that reconstruction and error detection have been performed for all possible combinations, frame reconstruction controller 16g transmits this information to highest reception level data selector 16h. Receiving the information, highest reception level data selector 16h refers to the reception level information from reception level measurement units 11g and 13g of base stations 11 and 13 and instructs data buffers 16b and 16c to transmit that one of the frames stored in data buffers 16b and 16c which has a higher reception level to connector 7 to transfer to a different network (step F8).

In the present embodiment, the number of base stations from which the base station controller receives a signal simultaneously is 2 and the number of units into which a frame is divided is 2.

However, the present invention is not limited to this, and both numbers can be determined arbitrarily and an increase of the numbers increases the possibility of reproduction of a no error frame.

Nevertheless, an excessive increase of the unit numbers excessively increases the number of combinations and may possibly give rise to an excessive increase of the processing time.

A possible countermeasure against this problem is to determine in advance a maximum number of times of actual combinations (for example, 10 times) by which a frame reconstructing operation is allowed to be performed repetitively within a restricted processing time period, stop a reconstructing operation at a point of time when the maximum number of times is reached and send that one of error-containing frames transmitted from a plurality of base stations which has the highest reception level to connector 7 to a different network.

FIGS. 10(a) to 10(d) are diagrammatic views showing an example of combinations of units upon division and reconstruction of a frame.

FIGS. 10(a) to 10(d) specifically illustrate an example of combinations of units when a frame is divided into two units and selective composition of the units is performed with regard to two base stations. Similarly to the frames shown in FIG. 9, the frame from base station 11 includes first unit 17a and second unit 18b while the frame from base station 13 includes first unit 17b and second unit 18b.

Referring to FIGS. 10(a) to 10(d), the symbol OK shown on any unit represents that the unit is no error, and NG represents that the unit has some error.

In the example shown, first unit 17a of the frame from base station 11 is no error while second unit 18a of the frame from base station 11 has some error, and first unit 17b of the frame from base station 13 is no error while second unit 18b of the frame from base station 13 has some error.

Figure 10A:
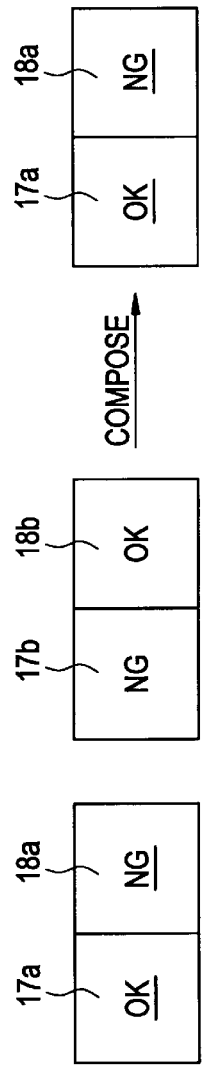
FIGS. 10(a) to 10(d) are diagrammatic views showing an example of combinations of units upon decomposition and reconstruction of a frame.
Figure 10B:
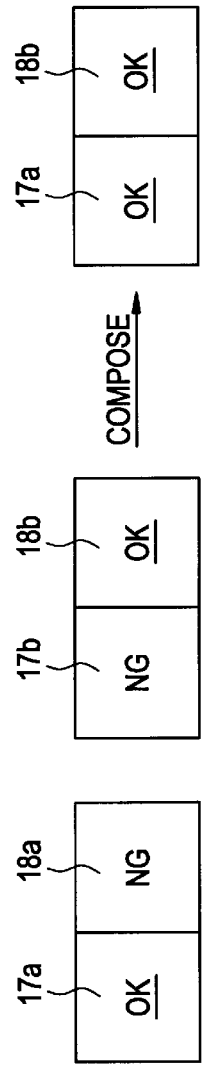
Figure 10C:
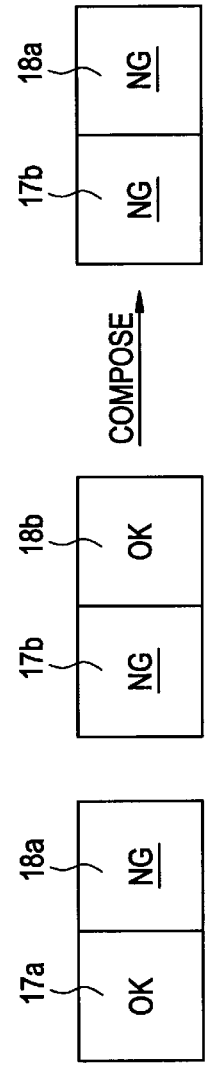
Figure 10D:
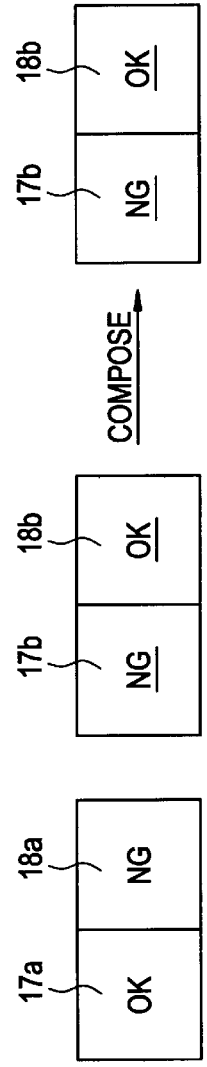

Further in FIGS. 10(a) to 10(d), any underscored symbol OK or NG represents that the unit is selected upon reconstruction. In particular, FIG. 10(a) illustrates a case wherein first unit 17a of the frame from base station 11 and second unit 18a of the frame of base station 11 are selectively composed; FIG. 10(b) illustrates another selective combination of first unit 17a of the frame from base station 11 and second unit 18b of the frame from base station 13; FIG. 10(c) illustrates a further selective combination of first unit 17b of the frame from base station 13 and second unit 18a of the frame from base station 11; and FIG. 10(d) illustrates a still further selective combination of first unit 17b of the frame from base station 13 and second unit 18b of the frame from base station 13.

As seen from FIGS. 10(a) to 10(d), the number of possible combinations of units in the present case is four. However, each of the combinations of FIGS. 10(a) and 10(d) includes units of the same frame which originally contains an error and has no possibility that it may become no error. Therefore, the combinations of FIGS. 10(a) and 10(d) can be eliminated from those combinations for which the operations in steps F3 and F4 of FIG. 7 are performed, and the operations should be performed only for the two combinations of FIGS. 10(b) and 10(c).

Further, if it is assumed that an error pattern has such a simplified characteristic that, when an error is caused to appear in a frame by radio transmission, a bit error possibly occurs in an equal probability in all units, then although the four patterns shown in FIGS. 10(a) to 10(d) are available as possible combinations of units, the two patterns of FIGS. 10(b) and 10(c) among them provide a frame which may possibly contain no error.

Where a frame is divided into two units and the units of the frame received by two base stations are combined to selectively compose a frame in this manner, the error rate of a frame to be transmitted from base station controller 16 to connector 7 to transfer to a different network can be reduced to ½ by rearrangement and error detection for two combinations of the units.

FIG. 11 is a table which indicates, in the form of a list, the frame error rate and the number of combinations which require processing when the number of base stations (base stations of a diversity reception) with regard to which selective composition is performed and the frame dividing number are varied to various values.

As seen from FIG. 11, the frame error rate decreases as the number of diversity base stations increases and as the frame dividing number increases. Although the number of combinations of units increases as the number of diversity base stations increases and as the frame dividing number increases, the required processing is possible if a high speed operation unit such as, for example, a digital signal processor (DSP) is used.

A second embodiment of the present invention is described hereinafter.

The present embodiment has a structure similar to that of the first embodiment described above with reference to FIGS. 5 and 6. Therefore, the present embodiment will be described with reference to FIGS. 5 and 6.

Figure 12:
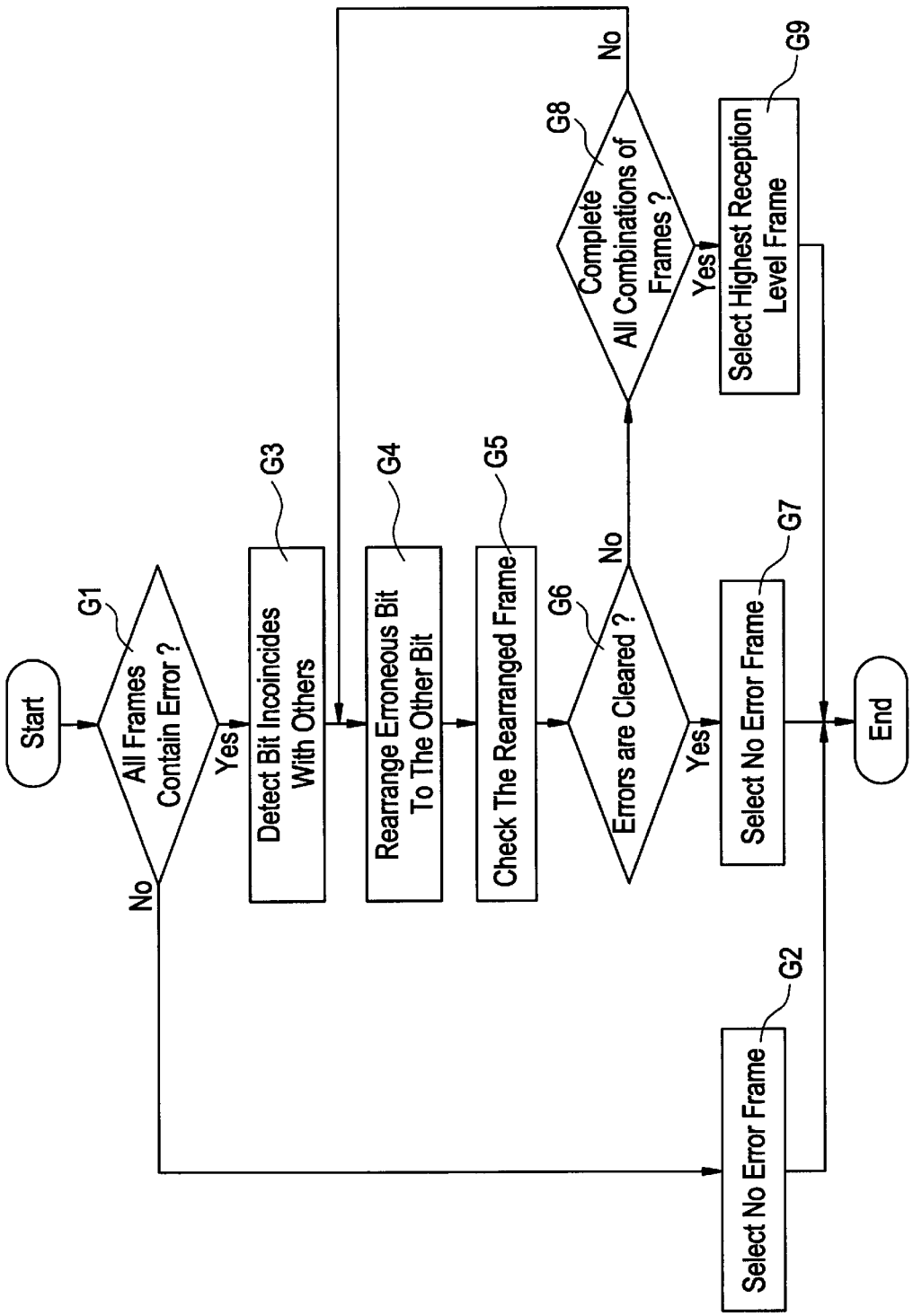
FIG. 12 is a flow chart illustrating operation of a second embodiment of the present invention.
Figure 13A:
FIGS. 13(a) to 13(f) are diagrammatic views illustrating significance of comparison which is performed in units of a bit of a frame by a frame reconstruction unit shown in FIG. 5 in the second embodiment of the present invention.
Figure 13B:
Figure 13C:
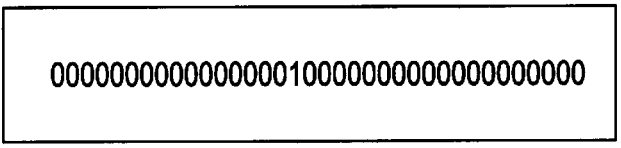
Figure 13D:
Figure 13E:
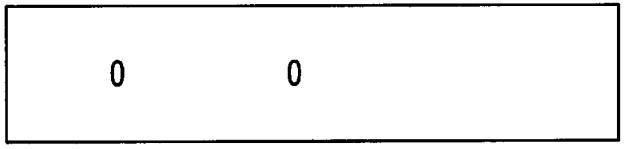
Figure 13F:
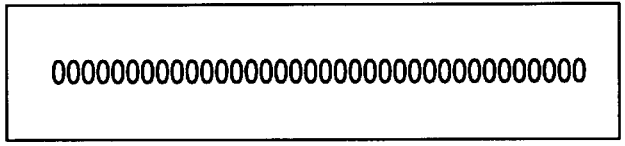

FIG. 12 is a flow chart illustrating operation of the second embodiment of the present invention.

A signal from mobile station 5 to a base station (upward link signal)is received by a plurality of base stations (in the present embodiment, base stations 11 and 13). Each base station performs error detection with an error detection signal (CRC check bits) contained in each radio frame (for example, of 10 ms) of a decoded signal illustrated in FIG. 4 and reception level measurement for each period of transmission power, and sends a result of the error detection and the measured reception level to a base station controller (in the present embodiment, base station controller 16) connected as a managing apparatus to the base station.

Information to be sent from each base station to the base station controller in the present embodiment includes:

1. user information (user information bits);
2. error detection information of the user information (CRC check bits);
3. error presence/absence information of the user information (CRC check: OK/NG); and
4. reception level information of a frame (Eb/I0: ratio between user information bit energy and average interference energy per band).

No error data selector 16f of base station controller 16 decides whether the frames received from the base stations contain a no error frame (step G1). If a no error frame is detected, then no error data selector 16f instructs that one of data buffers 16b and 16c, in which the no error frame is stored, to output the frame, thereby to transmit the no error frame to connector 7 to transfer to a different network (step G2).

On the other hand, if it is decided in step G1 that all of the frames from the base stations include some error, then no error data selector 16f informs frame reconstruction controller 16g of the result of decision, and frame reconstruction unit 16d compares the frame stored in data buffer 16b and the frame stored in data buffer 16c for unit of bit base under the control of frame reconstruction controller 16g to detect those bits which do not exhibit coincidence (step G3). The significance of the detection of incoincident bits will be described here with reference to FIGS. 13(a) to 13(f).

FIGS. 13(a) to 13(f) are diagrammatic views illustrating significance of comparison in units of a bit between frames performed by frame reconstruction unit 16d shown in FIG. 5 in the second embodiment of the present invention.

FIGS. 13(a) to 13(f) specifically illustrate significance of comparison when a frame transmitted from mobile station 5 is composed of bits all equal to 0 for simplified description. When the frame shown is received by the base stations, base station 11 receives a certain bit of "0" as "1" in error, and base station 13 receives another bit of "0" as "1" in error.

When the frame received by base station 11 and the frame received by base station 13 include bits which are different from each other in this manner, a combination which provides a frame having no error can be found out by performing comparison between the two frames to detect incoincident bits and successively change the incoincident bits to 1 or 0 until a result of a CRC check which exhibits no error is obtained.

Referring back to FIG. 12, if an incoincident bit is detected in step G3, then one of combinations of 0 and 1 at the incoincident bit is selected (step G4) and error detection is performed for the combination by error detector 16e (step G5). The error detection is the same processing as that performed by error detectors 11f and 13f shown in FIG. 5 and uses CRC check bits.

A result of the error detection in step G5 is transmitted to frame reconstruction controller 16g. Frame reconstruction controller 16g decides based on the received result of the error detection whether a frame based on the combination has no error (step G6). If the frame is no error one, then frame reconstruction controller 16g instructs error detector 16e to transmit the frame formed from the combination to connector 7 to transfer to a different network (step G7).

If the result of the error detection in step G5 proves that the frame formed from the combination contains some error (step G6), then frame reconstruction controller 16g decides whether reconstruction and error detection have been performed for all possible combinations or not (step G8).

If the decision in step G8 reveals that there remains a combination for which reconstruction and error detection have not been performed yet, then the control returns to step G4 so that reconstruction and error detection may be performed for the remained new combination.

If the decision in step G8 reveals that reconstruction and error detection have been performed for all possible combinations, then base station controller 16 transmits the decision to highest reception level data selector 16h. Highest reception level data selector 16h receiving the decision refers to the reception level information from reception level measurement units 11g and 13g of base stations 11 and 13 and instructs data buffers 16b and 16c to transmit that one of the frames stored in data buffers 16b and 16c which has a higher reception level to connector 7 to transfer to a different network (step G9).

In the second embodiment described above, the number of base stations from which the base station controller receives a signal simultaneously is 2. However, the present invention is not limited to this, and the number of base stations can be set to any value. The more the value increases, the more the possibility that a no error frame can be reconstructed increases.

In the second embodiment, the number of combinations which can be reconstructed by frame reconstruction unit 16d depends upon the number of base stations from which the base station controller receives a signal simultaneously and the number of erroneous bits in a frame. However, an excessive increase of the number of combinations may possibly give rise to an excessive increase of the processing time. A possible countermeasure against this problem is to determine in advance a maximum number of times (for example, 10 times) by which a frame reconstructing operation is allowed to be performed repetitively within a restricted processing time period, stop a reconstructing operation at a point of time when the maximum number of times is reached and send that one of error-contained frames transmitted from a plurality of base stations which has the highest reception level to connector 7 to transfer to a different network.

FIGS. 14(a) to 14(f) are diagrammatic views illustrating the number of combinations in frame reconstruction performed by frame reconstruction unit 16d shown in FIG. 5 in the second embodiment of the present invention.

In the reconstruction illustrated in FIGS. 10(a) to 10(f), in order to facilitate the description, all bit errors occur with different bits between the base stations, and the frame transmitted from mobile station 5 is formed from bits all equal to 0. Further, in the reconstruction illustrated, the frames exhibit two incoincident bits, and two-station selective diversity is used.

When the frame transmitted from mobile station 5 shown in FIG. 14 is received by the base stations, base station 11 receives a certain bit of "0" as "1" in error and base station 13 receives another bit of "0" as "1" in error. In particular, when the correct bits transmitted are . . . 0 . . . 0 . . . and the received data of base station 11 are . . . 1 . . . 0 . . . while the received data of base station 13 are . . . 0 . . . 1 . . . , four possible combinations of bits are . . . 0 . . . 0 . . . , . . . 0 . . . 1 . . . , . . . 1 . . . 0 . . . and . . . 1 . . . 1 . . . Since the combinations of . . . 0 . . . 1 . . . and . . . 1 . . . 0 . . . among them are already known as error-containing combinations, they can be eliminated from an object of frame reconstruction, and error detection should be performed only for the two combinations of . . . 0 . . . 0 . . . and . . . 1 . . . 1 . . . .

Accordingly, the maximum number of times of frame reconstruction is $2^2-2=2$ times where one frame contains two incoincident bits, $2^3-2=6$ times where one frame contains three incoincident bits, $2^4-2=14$ times where one frame contains four incoincident bits, and $2^N-2$ times where one frame includes N incoincident bits.

Next, an example of 3-station selective diversity in the second embodiment of the present invention will be described with reference to FIGS. 15(a) to 15(g).

FIGS. 15(a) to 15(g) are diagrammatic views illustrating the number of combinations in frame reconstruction performed by frame reconstruction unit 16d shown in FIG. 5 in the second embodiment of the present invention.

In the reconstruction illustrated in FIGS. 15(a) to 15(g), in order to facilitate the description, all bit errors occur with different bits between the base stations, and the frame transmitted from mobile station 5 is formed from bits all equal to 0. Further, in the reconstruction illustrated, the frames exhibit three incoincident bits, and three-station selective diversity is used.

In the example illustrated in FIGS. 15(a) to 15(g), the correct bits transmitted are . . . 0 . . . 0 . . . 0 . . . ; the received data of the first base station are . . . 1 . . . 0 . . . 1 . . . ; the received data of the second base station are . . . 0 . . . 0 . . . 1 . . . ; and the received data of the third base station are . . . 0 . . . 1 . . . 0 . . . In this case, the eight combinations of bits of . . . 0 . . . 0 . . . 0 . . . , . . . 0 . . . 0 . . . 1 . . . , . . . 0 . . . 1 . . . 0 . . . , . . . 0 . . . 1 . . . 1 . . . , . . . 1 . . . 0 . . . 0 . . . , . . . 1 . . . 0 . . . 1 . . . , . . . 1 . . . 1 . . . 0 . . . , and . . . 1 . . . 1 . . . 1 . . . Among them, the combinations . . . 1 . . . 0 . . . 0 . . . , . . . 0 . . . 0 . . . 1 . . . and . . . 0 . . . 1 . . . 0 . . . are already known as error-containing combinations, and therefore, they can be eliminated from an object of frame reconstruction. Consequently error detection should be performed for the five combinations of . . . 0 . . . 0 . . . 0 . . . , . . . 0 . . . 1 . . . 1 . . . , . . . 1 . . . 0 . . . 0 . . . , . . . 1 . . . 0 . . . 1 . . . , . . . 1 . . . 1 . . . , and . . . 1 . . . 1 . . . 1 . . . .

Accordingly, the maximum number of times of frame reconstruction is $2^3-3=5$ times where one frame includes three incoincident bits, $2^4-3=13$ times where one frame includes four incoincident bits, and $2^N-3$ times where one frame includes N incoincident bits.

Next, an example of a method of selecting a bit upon reconstruction of a frame in the second embodiment of the present invention will be described with reference to FIGS. 16(a) to 16(f). As described above, an increase of the number of incoincident bits increases the number of combinations of bits upon reconstruction of a frame as much and give rises to an increase of the processing time. Therefore, a technique for discovering a combination of bits, from which a no error frame can be formed, as fast as possible is described.

FIGS. 16(a) to 16(f) are diagrammatic views illustrating which one of combinations in frame reconstruction performed by frame reconstruction unit 16d shown in FIG. 5 in the second embodiment of the present invention is a promising candidate.

In the reconstruction illustrated in FIGS. 16(a) to 16(f), in order to facilitate the description, all bit errors occur with different bits among the base stations, and the frame transmitted from mobile station 5 is formed from bits all equal to 0. Further, in the reconstruction illustrated, the frames exhibit six incoincident bits, and three-station selective diversity is used.

As is seen in FIGS. 16(a) to 16(f), where the number of base stations which perform selective diversity is three or more, an incoincident bit of a base station may possibly have a value different from that of another base station but same as that of a further base station. For example, in FIGS. 16(a) to 16(f), the value of the leftmost one of the incoincident bits shown is 1 in the frame received by the first base station, but 0 in the frame received by the second base station and 0 in the frame received by the third base station. Accordingly, at this bit, the second and third base stations receive "0", and it is considered from the principle of majority that possibly the value of the bit is 0 rather than 1.

Thus, when frame reconstruction unit 16d shown in FIG. 5 performs frame reconstruction, it first produces a frame which adopts a combination which uses values determined by majority for individual incoincident bits, and then error detection by error detector 16e is performed for the frame. This reduces the processing time required to find out a no error frame.

Figure 17:
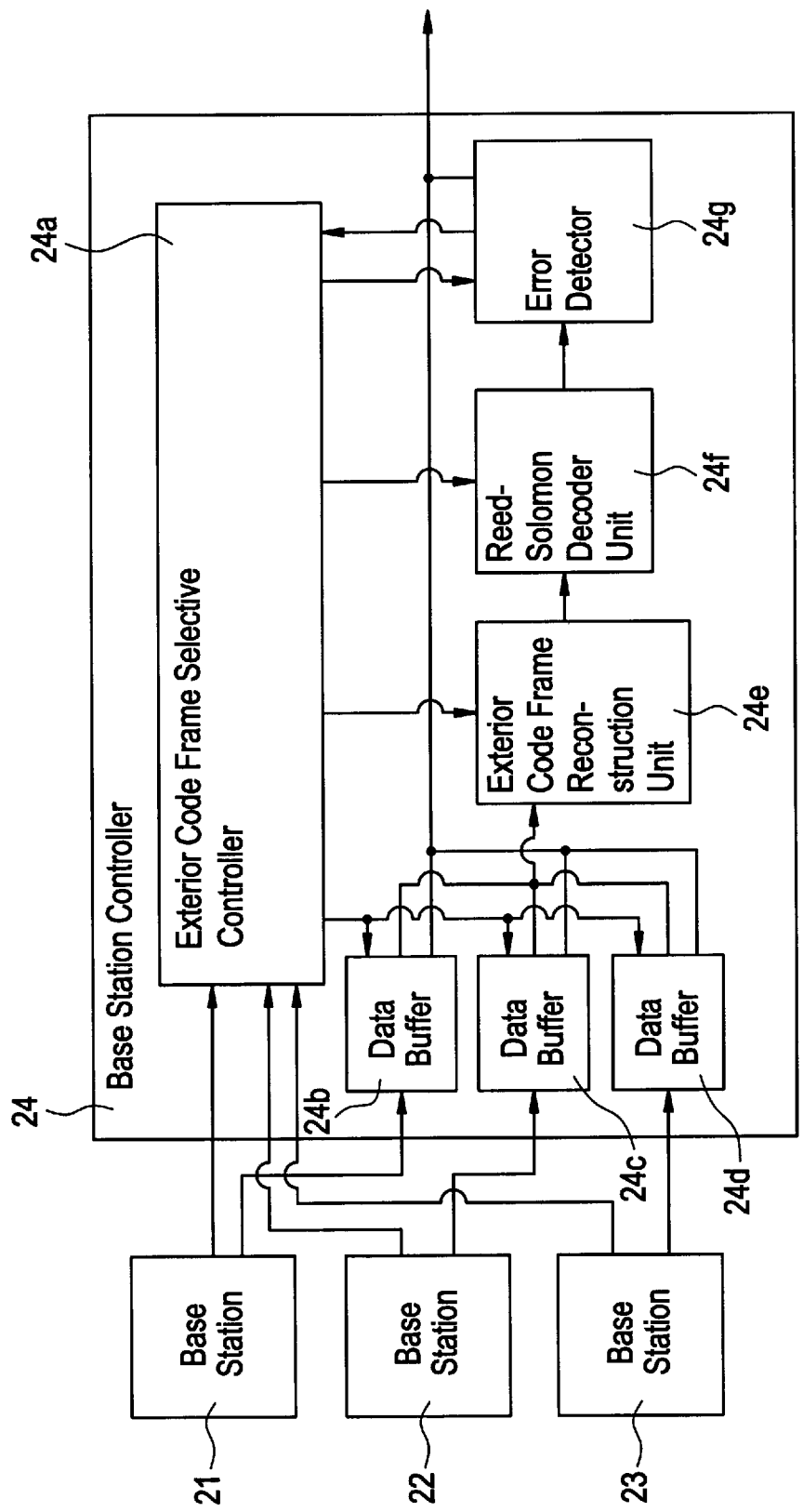
FIG. 17 is a block diagram showing a structure of a base station controller of a third embodiment of a mobile telephone system according to the present invention.

FIG. 17 is a block diagram showing a structure of a base station controller in a third embodiment of a mobile telephone system according to the present invention.

In the present embodiment, the present invention is applied to a communication system which uses the Reed-Solomon code which is one of conventionally well-known error correction codes.

The structure of the present embodiment is different from that of the first embodiment of the present invention described above in that the base station controller includes a data buffer for storing data from base stations, an external code frame selective composition controller for processing an external code for data communication, an external code frame reconstruction unit, a Reed-Solomon decoder for an external code, and an error detector for performing a CRC check.

In the present embodiment, mobile station 5 shown in FIG. 1 communicates simultaneously with three base stations 21, 22 and 23 shown in FIG. 17. Base stations 21, 22 and 23 are connected to base station controller 24 shown in FIG. 17 which serves as a managing apparatus to them, and base station controller 24 is connected to connector 7 to interface with different networks.

Base station controller 24 includes external code frame selective composition controller 24a, data buffer 24b for storing a signal from base station 21, data buffer 24c for storing a signal from base station 22, data buffer 24d for storing from base station 23, external code frame reconstruction unit 24e, Reed-Solomon decoder 24f, and error detector 24g.

Operation of the present embodiment will be described below.

Figure 18:
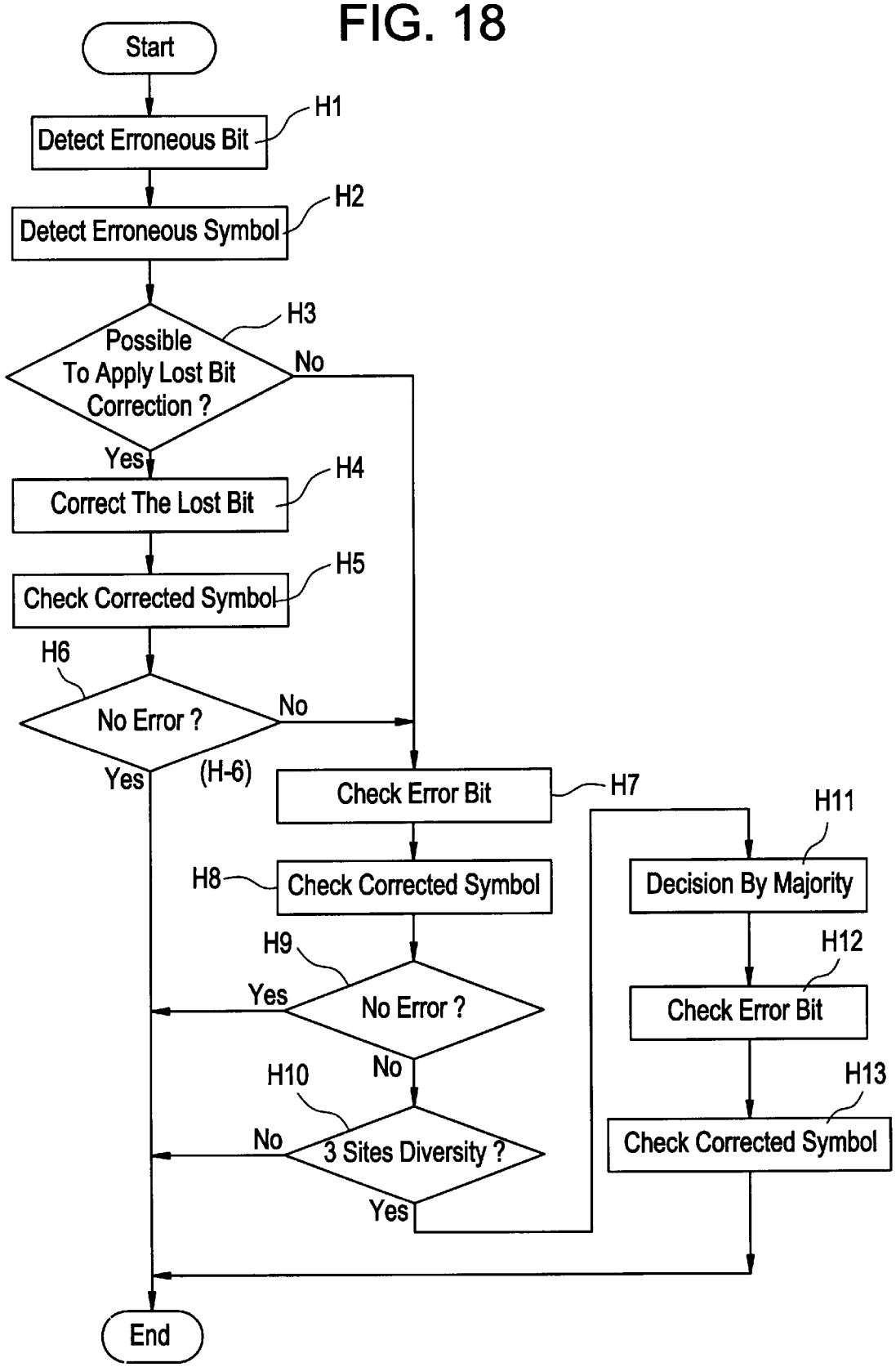
FIG. 18 is a flow chart illustrating operation of the third embodiment of the present invention.

FIG. 18 is a flow chart illustrating operation of the third embodiment of the present invention.

The Reed-Solomon code adds check symbols to information symbols to allow error correction and loss correction. The error correction here signifies a process of restoring a correct signal transmitted from the transmission side when it is not known which symbol of a received signal is erroneous, and the loss correction signifies a process of restoring a correct signal transmitted from the transmission side when it is known which symbol of a received signal is erroneous.

As it is well known in the art, an error correction capability can correct N error symbols when 2N check symbols are referred. The error correction can be performed when error symbol position information (information of which bit of a received signal is erroneous) is not-available. On the other hand, the lost symbol correction capability can correct 2N lost symbols where 2N check symbols are referable. The lost symbol correction can be performed when error symbol position information is available. In short, if error symbol positions are known, a number of symbols twice that where they are unknown can be corrected.

In the operation illustrated in FIG. 18, detection of error bits is performed first (step H1). In the detection of error bits, frames received from a plurality of base stations are compared with each other for bit unit base in a similar manner as in the second embodiment of the present invention described above.

One symbol is composed of, for example, 6 bits. If such an incoincident bit as described above in connection with the second embodiment of the present invention is included in the 6 bits, then the symbol formed from the 6 bits is determined as an error symbol (step H2). In particular, if the positions of error bits of signals received from the base stations are different from each other, then error symbol position information is obtained by the processing just described. Accordingly, the present embodiment is advantageous in that it exhibits a high probability that error position information may be obtained, so that it allows the correction of a number of symbols twice than the number of symbols which can be corrected in a communication system which merely uses the Reed-Solomon code.

Then, it is checked whether lost symbol correction is available or not (whether error position information has been obtained or not) (step H3). If lost symbol correction is possible, then the error position information is used to perform lost symbol correction (step H4), and then a CRC check is performed for a result of the lost symbol correction to perform error detection (step H5). If no error is detected by the error detection, then the processing comes to an end. However, if an error is detected, since the remain of the error signifies that the error position information in step H2 was wrong, ordinary error correction with the Reed-Solomon code is performed (step H7).

Then, CRC checking is performed for a result of the error correction in step H7 to perform error detection (step H8). If no error is detected by the error detection, then the processing comes to an end. However, if an error is detected, then decision by majority described above with reference to FIG. 16 is performed (step H11). Since the decision by the majority requires that the number of base stations with regard to which diversity is performed shall be three or more, the flow chart of FIG. 18 includes step H10 inserted for confirming the number of base stations, i.e., the site number.

After the decision by majority, step H11 is performed, ordinary error correction with the Reed-Solomon code is performed for a result of the decision by majority (step H12). Then, a CRC check is performed for a result of the error correction in step H12 to perform error detection (step H13).

If no error is detected by the error detection, then the processing comes to an end. However, if an error is detected also by the error detection, then, for example, that one of the error-containing frames transmitted from the base stations which has the highest reception level may be transmitted to connector 7 to transfer to a different network similarly as in the second embodiment of the present invention described above.

Next, a fourth embodiment of a mobile telephone system according to the present invention will be described. In the present embodiment, the present invention is applied to a communication system which employs a convolution coding/Viterbi decoding method which is one of conventionally well-known error correction codes.

The present embodiment has a structure similar to that of FIGS. 5 and 6 and operates in accordance with an operation flow chart similar to that of FIG. 7. Therefore, the present embodiment will be described with reference to FIGS. 5, 6 and 7.

First, the structure of the present embodiment will be described with reference to FIGS. 5 and 6.

A signal transmitted from mobile station 5 is received by a plurality of base stations. For example, it is received by base stations 11 and 13 shown in FIG. 5.

In each of base stations 11 and 13, receiver 11b or 13b performs high frequency demodulation of the signal received by reception antenna 11a or 13a, and counter spreader 11d or 13d counter spreads the resulting signal from receiver 11b or 13b, which is a signal spread with pseudo noise (PN) codes. The counter spread signals from counter spreaders 11d and 13d are sent to decoders 11e and 13e and reception level measurement units 11g and 13g, respectively.

Decoders 11e and 13e Viterbi decode the signals in the form of convolutional codes received from counter spreaders 11d and 13d into user information signals and simultaneously obtain reliability information of individual units divided from the frame upon the Viterbi decoding. The reliability information is based on the magnitude of reception energy, and indicates a higher reliability as the energy increases.

Error detectors 11f and 13f perform error detection with CRC check bits. Reception level measurement units 11g and 13g measure the levels of the received signals.

Base stations 11 and 13 transmit the user information bits and the CRC check bits shown in FIG. 4, the error presence/absence information of results of the detection by error detectors 11f and 13f, the reception level information of results of the measurement by reception level measurement units 11g and 13g, respectively, and the reliability information of the units divided from the frame to base station controller 16.

As it is shown in FIG. 6, the user information bits and the CRC check bits from error detectors 11f and 13f are inputted to data buffers 16b and 16c, respectively. The error presence/absence information from error detectors 11f and 13f is inputted to no error data selector 16f of selective composition controller 16a. The reception level information from reception level measurement units 11g and 13g is inputted to highest reception level data selector 16h of selective composition controller 16a. The reliability information of the units divided from the frame is inputted to no error data selector 16f of selective composition controller 16a.

Selective composition controller 16a controls data buffers 16b and 16c which store the user information bits and the CRC bits, frame reconstruction unit 16d which divides and reconstructs a frame formed from the user information bits and the CRC check bits, and error detector 16e which performs error correction of the reconstructed frame with the CRC check bits. The user information is sent from data buffers 16b and 16c to connector 7 to a different network directly or through frame reconstruction unit 16d and error detector 16e.

Operation of the present embodiment will be described below with reference to FIG. 7.

A signal from mobile station 5 to a base station (upward link signal) is received by a plurality of base stations (in the present embodiment, base stations 11 and 13). Each base station performs error detection with an error detection signal (CRC check bits) contained in each radio frame (for example, of 10 ms) of a decoded signal illustrated in FIG. 4 and reception level measurement for each period of transmission power, and sends a result of the error detection and the measured reception level to a base station controller (in the present embodiment, base station controller 16) connected as a host apparatus to the base station.

By the way, according to the Viterbi decoding method or the like method, reliability information of each of bits of an object of Viterbi decoding can be obtained. Consequently, reliability information of each unit can be obtained by integrating reliability information of each bit. In the present embodiment, the reliability information is utilized when various combinations of units are produced to find out a no error frame as in the first embodiment of the present invention described above.

Information to be sent from each base station to the base station controller in the present embodiment includes:

1. user information (user information bits);
2. error detection information of the user information (CRC check bits);
3. error presence/absence information of the user information (CRC check: OK/NG);
4. reception level information of a frame (Eb/I0: ratio between user information bit energy and average interference energy per band); and
5. reliability information of units divided from the frame.

No error data selector 16f of base station controller 16 decides whether the frames received from the base stations contain a no error frame (step F1). If a no error frame is detected, then no error data selector 16f instructs that one of data buffers 16b and 16c, in which the no error frame is stored, to output the frame, thereby to transmit the no error frame to connector 7 to transfer to a different network (step F2).

On the other hand, if it is decided in step F1 that all of the frames from the base stations contain some error, then no error data selector 16f informs frame reconstruction controller 16g of the decision, and frame reconstruction unit 16d performs decomposition and reconstruction of the frames stored in data buffers 16b and 16c under the control of frame reconstruction controller 16g (step F3). The reconstruction will be described hereinafter.

The reconstruction in the present embodiment is similar to that in the first embodiment of the present invention described above except that from which combination of units out of a plurality of units combinations a frame is reconstructed actually.

The reproduction in the present embodiment is performed in accordance with the following two rules:

1. if a result of rearrangement of units divided from frames includes units which are all the same as those from the same base station, then it is apparent that the combination includes some error, and therefore, no error detection processing is performed with the combination; and
2. a candidate for rearrangement is selected from higher reliability units divided from a frame in a descending order.

A frame reconstructed in accordance with the rules described above is subject to error detection by error detector 16e. If no error is detected by the error detection, then the reconstructed frame is transmitted to connector 7 to transfer to a different network (step F6).

If the result of the error detection in step F4 proves that the combination of units has some error (step F5), then frame reconstruction controller 16g decides whether or not reconstruction and error detection have been performed for all of those combinations which may possibly contain no error (step F7).

If it is decided in step F7 that there remains a combination for which reconstruction and error detection have not been performed as yet, then the control returns to step F3 so that reconstruction and error detection may be performed for the new combination.

If the decision in step F7 reveals that reconstruction and error detection have been performed for all possible combinations, then frame reconstruction controller 16g transmits this information to highest reception level data selector 16h. Highest reception level data selector 16h receiving the information refers to the reception level information from reception level measurement units 11g and 13g of base stations 11 and 13 and instructs data buffers 16b and 16c to transmit that one of the frames stored in data buffers 16b and 16c which has a higher reception level to connector 7 to transfer to a different network (step F8).

Also in the present embodiment, it is a possible countermeasure to determine in advance a maximum number of times (for example, 10 times) by which a frame reconstructing operation is allowed to perform repetitively within a restricted processing time period, stop a reconstructing operation at a point of time when the maximum number of times is reached and send that one of error-containing frames transmitted from a plurality of base stations which has the highest reception level to connector 7 to transfer to a different network.

In the present embodiment, each of decoders 11e and 13e of base stations 11 and 13 obtains reliability information of each of units divided from a frame and transmits the reliability information to base station controller 16. However, the base station controller cannot know for which unit the received reliability information belongs and cannot utilize the reliability information unless recognizing the dividing number and the dividing method for the frame by decoders 11e and 13e. Therefore, the frame dividing number and dividing method must be known at the base stations and the base station controller.

The first advantage of the present invention is that, when signals received by all base stations in the base stations related in a selective diversity, the error rate can be reduced.

The reason is that, by dividing a signal received by each base station into a plurality of units and performing reconstruction and error re-detection for all possible combinations of the divided units of the received signals as described above in connection with the first embodiment or by performing comparison of the signals received by the base stations and performing reconstruction and error redetection for all possible combinations of information bits at positions of the signals at which the signals are different from each other, the opportunity to obtain a no error signal can be increased.

The second advantage of the present invention is that the function described above can be implemented readily.

The reason is that, although the present invention additionally provides a frame reconstruction function and an error detection function as new functions to a conventional base station controller, a communication protocol similar to a protocol used conventionally can be used as the communication protocol between the base stations and the base station controller.

The third advantage of the present invention is that, when signals received by all base stations in the site diversity, reduction of the error rate and an increase in speed of selective composition processing can be realized simultaneously.

The reason is that, by dividing each of signals received by the base stations into a plurality of units, determining reliability information for each of the signal units divided upon Viterbi decoding and reconstructing a frame with the divided signal units selectively used in a descending order of the reliability as described in connection with the fourth embodiment, a combination of no error signal units can be find out rapidly.

What is claimed is:

1. A communication system, wherein communication signal from a transmitter is received by a plurality of receivers, comprising:

means for detecting whether received signals contain an error portion or not; and means for composing a no error signal by rearranging portions of a respective received signal with portions of received signals from said plurality of receivers to create a rearranged frame, performing error re-detection on the rearranged frame and correcting the error portions of the rearranged frame to produce a signal free from a communication error.

2. A mobile telephone system which employs a site diversity reception among related base stations wherein a signal transmitted from a mobile station is received by a plurality of base stations and said base stations transmit the respective received signals to a base station controller, said base station controller comprising:

means for detecting an error portion of all of the received signal;

means for composing a no error signal by rearranging portions of a received signal from a respective base station with portions of the received signals from said plurality of base stations to create a rearranged frame, performing error re-detection on the rearranged frame and correcting the error portions of the rearranged frame to produce a signal free from a communication error.

3. A mobile telephone system according to claim 2, wherein each of the signals received through said base stations by said base station controller includes a frame composed of user information bits which are real information transmitted from said mobile station and CRC check bits which form error detection codes, and said base station controller divides each of frames from said base stations into units of a predetermined size and rearranges the units into several combinations to obtain a no error signal.

4. A mobile telephone system according to claim 3, wherein the signal received from said mobile station by said base stations is a signal applied the convolutional encoding, comprising:

means for calculating reliability information which represents a magnitude of reception energy for each of units divided from the frame when each of said base stations executes Viterbi decode for the signal; and means for selecting one of the units whose reliability information is a highest as a rearrangement candidate when said base station controller changes a combination of the units to decrease the processing time required to rearrange a no error frame.

5. A mobile telephone system according to claim 2, wherein said base station controller further comprises:

means for comparing the signals received through said base stations with each other in bit unit base; and means for replacing value of a bit which does not coincide with bit value of other received signals to produce a no error signal.

6. A mobile telephone system which employs a site diversity reception among related base stations wherein a signal transmitted from a mobile station is received by a plurality of base stations and said base stations transmit the respective received signals to a base station controller and the signal received from said mobile station by said base stations is a signal applied Reed-Solomon code, said base station controller comprising:

means for comparing the signals received through said base stations with each other in bit unit base, means for estimating that a symbol which contains a bit incoincident with other received signal is an erroneous symbol, and means for arranging by adding the result of the estimation as error symbol position information in Reed-Solomon decoding to improve the error correction capability by the Reed-Solomon decoding.

7. A base station controller in a mobile telephone system which employs a site diversity reception among base station, wherein a signal transmitted from a mobile station is received by a plurality of base stations and said base stations transmit the signal to said base station controller, comprising:

means for detecting errors within each of signals received from the base stations;

means for composing a no error signal by rearranging portions of the received signals from a respective base station with portions of received signals from said plurality of base stations to create a rearranged frame, performing error re-detection on the rearranged frame and correcting the error portions of the rearranged frame to produce a signal free from a communication error.

8. A base station controller according to claim 7, wherein each of signals received from said base stations is composed of frame including user information signal bits which are transmitted from a mobile station and CRC check bits which are an error detection signal, and said base station controller further comprises: means for dividing each of the frames received from said base stations into units of a predetermined size; and means for changing the combination of the units to produce a no error signal.

9. A base station controller according to claim 8, wherein the signal received from said mobile station by said base stations is a signal applied the convolutional encoding, said base station controller further comprises:

means for receiving, from each of said base stations, reliability information which represents a magnitude of reception energy for each of units divided from the frame; and means for selecting a unit having highest reliability information as a candidate for replacement for changing the unit combination to improve the processing time of composing no error signal.

10. A base station controller according to claim 7, wherein said base station controller further comprises means for comparing the signals received from said base stations with each other in bit unit base and means for changing the value of a bit incoincident with a bit of signals of other base stations to produce a no error signal.

11. A base station controller for a mobile telephone system which employs a site diversity reception among base station, wherein a signal transmitted from a mobile station is received by a plurality of base stations and said each of base stations transmits the signal to said base station controller, wherein signals received from the base stations are signals applied the Reed-Solomon encoding, said base station controller comprising:

means for comparing among signals received from base stations with each other in bit unit base;

means for estimating a symbol which contains a bit incoincident with signals received from other base stations as a erroneous signal;

means for decoding the Reed-Solomon encoded signal by applying the result of the estimation as error symbol position information to improve the error correction capability of the Reed-Solomon decoding.

12. A method of site diversity reception among related base stations wherein a signal transmitted from a mobile station is received by a plurality of base stations and said base stations transmit the respective received signals to a base station controller, wherein said base station controller comprising the steps of:

detecting errors within each of signals received from base stations;

composing a no error signal by rearranging portions of the received signals from a respective base station with portions of received signals from said plurality base stations to create a rearranged frame, performing error re-detection on the rearranged frame and correcting the error portions of the rearranged frame to produce a signal free from a communication error.

13. A method of site diversity reception among related base stations according to claim 12, wherein each of the signals received through said base stations by said base station controller includes a frame composed of user information bits which are real information signal transmitted from said mobile station and CRC check bits which form error detection codes, said base station controller further comprises the steps of:

dividing each of frames from said base stations into units of a predetermined size; and rearranging the units into a plurality of combinations to obtain a signal having no error.

14. A method of site diversity reception among related base stations according to claim 13, wherein the signal received from said mobile station by said base stations is a signal applied convolutional encoding, further comprises the steps of:

obtaining reliability information which represents a magnitude of reception energy for each of units divided from the frame when each of said base stations execute Viterbi decoding the signal, and selecting an unit having the highest reliability information as a candidate unit for replacing when said base station controller changes a combination of the units, to improve the processing time of producing a signal having no error.

15. A method of site diversity reception, among related base stations according to claim 12, further comprises the steps of:

comparing the signals received through said base stations with each other in bit unit base;

changing the value of a bit incoincident with bits of other signals through the comparison step to produce a signal having no error.

16. A method of site diversity reception among related base stations a signal transmitted from a mobile station is received by a plurality of related base stations and said base stations transmit the respective received signals to a base station controller, wherein the signal received from said mobile station by said base stations is applied a signal of Reed-Solomon encoding comprising the steps of:

comparing the signals received through said base stations with each other in bit unit base;

estimating a symbol containing a bit incoincident with a bit of other signals received from respective base stations through the comparison as a erroneous symbol; and decoding the signal by the Reed-Solomon decoding with applying the result of the estimation as the error symbol position information to improve the capability of the Reed-Solomon decoding.

* * * * *

UNITED STATES PATENT AND TRADEMARK OFFICE
CERTIFICATE OF CORRECTION

PATENT NO.    : 6,728,919 B1
DATED         : April 27, 2004
INVENTOR(S)   : Takayuki Kondo and Yoshinori Nagata It is certified that error appears in the above-identified patent and that said Letters Patent is hereby corrected as shown below:

<u>Column 13,</u>
Line 42, "...1...0...1...;" has been replaced with -- ...1...0...0...; --.

Signed and Sealed this

Fifth Day of October, 2004

JON W. DUDAS
*Director of the United States Patent and Trademark Office*